US012626493B2

(12) United States Patent
Sun

(10) Patent No.: US 12,626,493 B2
(45) Date of Patent: May 12, 2026

(54) METHOD AND APPARATUS FOR DETERMINING SET OF TRAINING SAMPLES, METHOD AND APPARATUS FOR TRAINING MODEL, AND METHOD AND APPARATUS FOR DETECTING OBJECT

(71) Applicant: Black Sesame Technologies (Chengdu) Co., Ltd., Chengdu (CN)

(72) Inventor: Hao Sun, Chengdu (CN)

(73) Assignee: Black Sesame Technologies (Chengdu) Co., Ltd., Chengdu (CN)

( * ) Notice: Subject to any disclaimer, the term of this patent is extended or adjusted under 35 U.S.C. 154(b) by 308 days.

(21) Appl. No.: 18/235,195

(22) Filed: Aug. 17, 2023

(65) Prior Publication Data

US 2024/0062524 A1 Feb. 22, 2024

(30) Foreign Application Priority Data

Aug. 17, 2022 (CN) .......................... 202210987671.6

(51) Int. Cl.
*G06V 10/774* (2022.01)
*G06V 10/22* (2022.01)
*G06V 10/82* (2022.01)
(52) U.S. Cl.
CPC ............ *G06V 10/774* (2022.01); *G06V 10/22* (2022.01); *G06V 10/82* (2022.01)
(58) Field of Classification Search
None
See application file for complete search history.

(56) References Cited

U.S. PATENT DOCUMENTS

2021/0224591 A1* 7/2021 Mukherjee ................ G06T 7/74
2023/0237835 A1* 7/2023 Fu .......................... G06V 10/26
382/103

FOREIGN PATENT DOCUMENTS

CN 110135456 A 8/2019
CN 110276346 A 9/2019
(Continued)

OTHER PUBLICATIONS

Kim et al., "Probabilistic anchor assignment with iou prediction for object detection," CoRR, submitted on Sep. 5, 2020, arXiv:2007.08103v2, 22 pages.
(Continued)

*Primary Examiner* — Leon Flores
(74) *Attorney, Agent, or Firm* — Fish & Richardson P.C.

(57) ABSTRACT

A method and an apparatus for determining a set of training samples, a method and an apparatus for training a model, and a method and an apparatus for detecting an object, the method including: performing a movement operation on an object region in a sample image to determine a plurality of enhanced object regions; and determining, based on a plurality of candidate regions corresponding to the sample image and the plurality of enhanced object regions, a set of training samples corresponding to the sample image to obtain an object detection model by training a network model based on the set of training samples corresponding to the sample image. A probability of a small object region being selected as a set of training samples is improved without affecting sample selection of a large-size object region, thereby improving detection accuracy of an object detection model in detecting the small object.

20 Claims, 14 Drawing Sheets

310

Performing a movement operation on an object region in a sample image to determine a plurality of enhanced object regions

320

Determining, based on a plurality of candidate regions corresponding to the sample image and the plurality of enhanced object regions, a set of training samples corresponding to the sample image to obtain an object detection model by training a network model based on the set of training samples corresponding to the sample image

(56)                    References Cited

FOREIGN PATENT DOCUMENTS

CN        112464785  A      3/2021
CN        114863206  A      8/2022

OTHER PUBLICATIONS

Li et al., "Perceptual generative adversarial networks for small object detection," Proceedings of the IEEE Conference on Computer Vision and Pattern Recognition, Jul. 21-26, 2017, pp. 1222-1230.

Liu et al., "Path aggregation network for instance segmentation," Proceedings of the IEEE Conference on Computer Vision and Pattern Recognition, Jun. 18-23, 2018, pp. 8759-8768.

Tan et al., "Efficientdet: Scalable and efficient object detection," Proceedings of the IEEE/CVF Conference on Computer Vision and Pattern Recognition, Jun. 13-19, 2020, pp. 10781-10790.

Yu et al., "Scale match for tiny person detection," Proceedings of the IEEE/CVF Winter Conference on Applications of Computer Vision, Mar. 1-5, 2020, pp. 1257-1265.

Zhang et al., "Bridging the gap between anchor-based and anchor-free detection via adaptive training sample selection," Proceedings of the IEEE/CVF Conference on Computer Vision and Pattern Recognition, Jun. 13-19, 2020, pp. 9759-9768.

Office Action in Chinese Appln. No. 202210987671.6, mailed on May 31, 2025, 15 pages (with English translation).

* cited by examiner

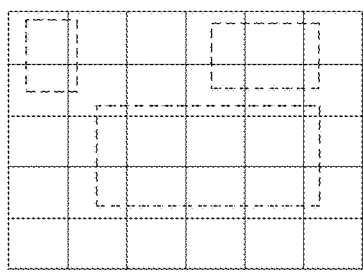

FIG. 4a

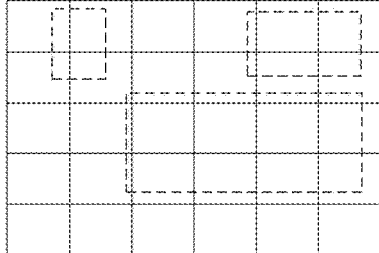

FIG. 4b

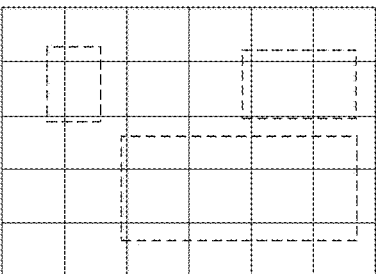

Performing, based on a preset path, the movement operation on the object region in the sample image to determine the plurality of enhanced object regions

320

Determining, based on a plurality of candidate regions corresponding to the sample image and the plurality of enhanced object regions, a set of training samples corresponding to the sample image to obtain an object detection model by training a network model based on the set of training samples corresponding to the sample image

FIG. 5

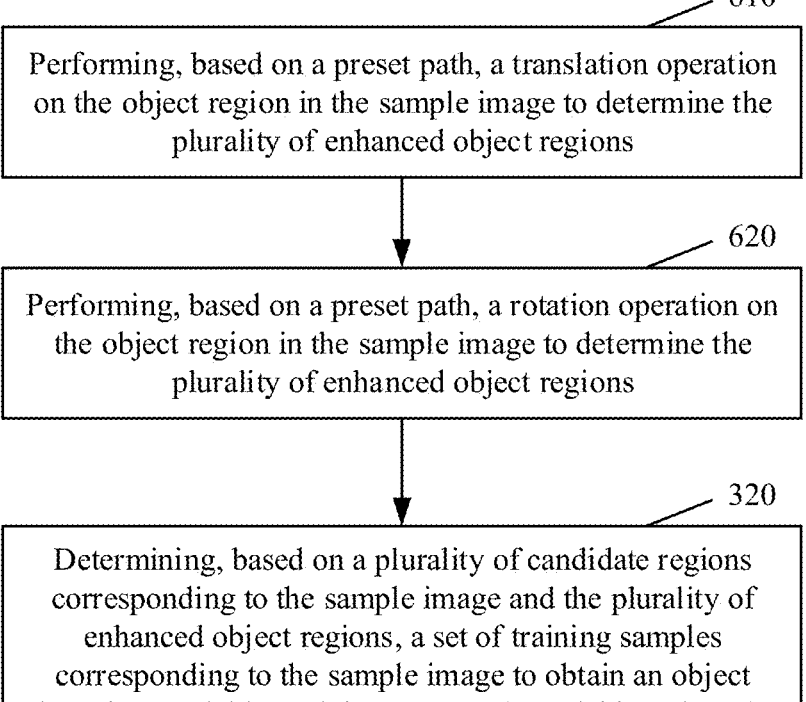

610

Performing, based on a preset path, a translation operation on the object region in the sample image to determine the plurality of enhanced object regions

620

Performing, based on a preset path, a rotation operation on the object region in the sample image to determine the plurality of enhanced object regions

320

Determining, based on a plurality of candidate regions corresponding to the sample image and the plurality of enhanced object regions, a set of training samples corresponding to the sample image to obtain an object detection model by training a network model based on the set of training samples corresponding to the sample image

Figure 6B:
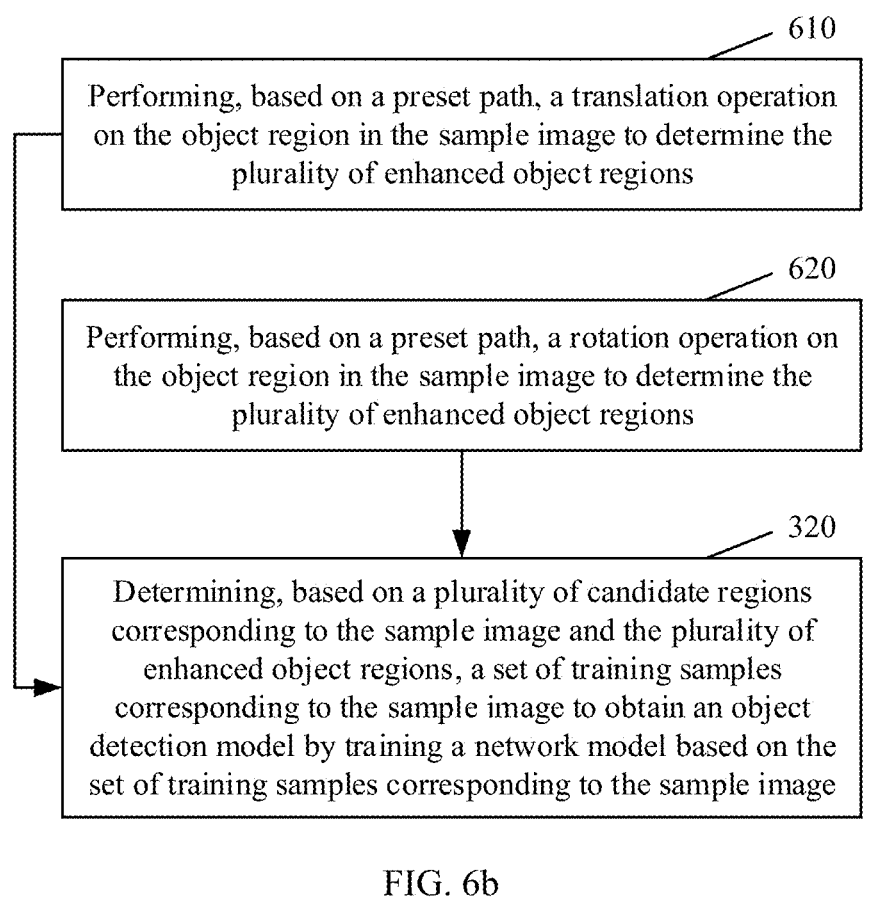

Performing, based on a preset path, a translation operation on the object region in the sample image to determine the plurality of enhanced object regions

620

Performing, based on a preset path, a rotation operation on the object region in the sample image to determine the plurality of enhanced object regions

320

Determining, based on a plurality of candidate regions corresponding to the sample image and the plurality of enhanced object regions, a set of training samples corresponding to the sample image to obtain an object detection model by training a network model based on the set of training samples corresponding to the sample image

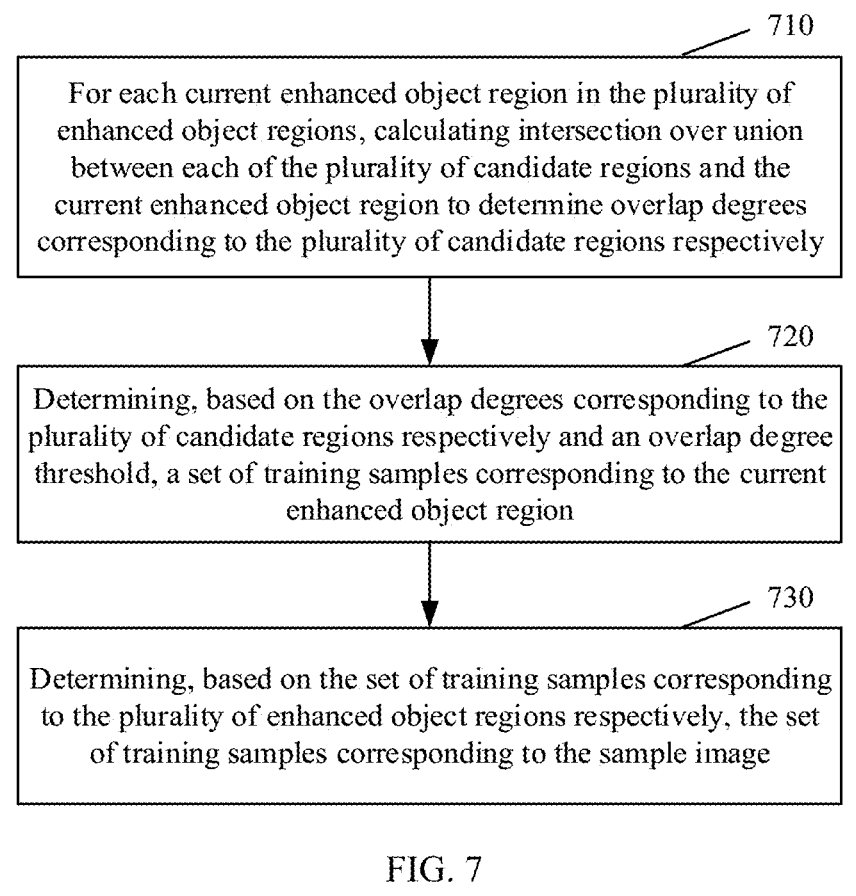

For each current enhanced object region in the plurality of
enhanced object regions, calculating intersection over union
between each of the plurality of candidate regions and the
current enhanced object region to determine overlap degrees
corresponding to the plurality of candidate regions respectively

720

Determining, based on the overlap degrees corresponding to the
plurality of candidate regions respectively and an overlap degree
threshold, a set of training samples corresponding to the current
enhanced object region

730

Determining, based on the set of training samples corresponding
to the plurality of enhanced object regions respectively, the set
of training samples corresponding to the sample image

FIG. 7

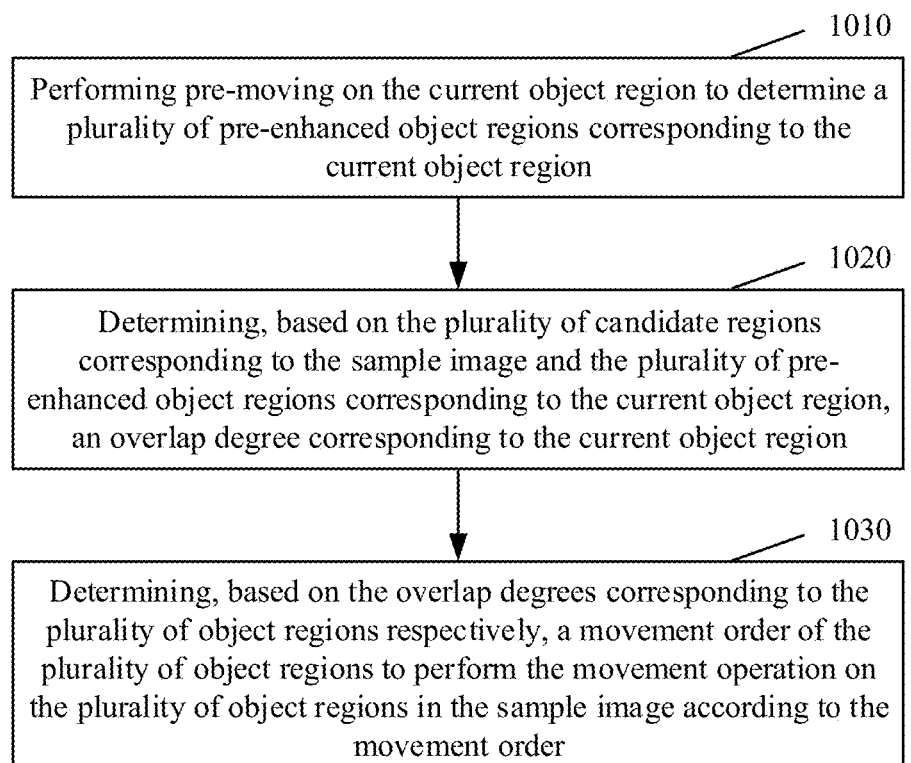

1010

Performing pre-moving on the current object region to determine a plurality of pre-enhanced object regions corresponding to the current object region

1020

Determining, based on the plurality of candidate regions corresponding to the sample image and the plurality of pre-enhanced object regions corresponding to the current object region, an overlap degree corresponding to the current object region

1030

Determining, based on the overlap degrees corresponding to the plurality of object regions respectively, a movement order of the plurality of object regions to perform the movement operation on the plurality of object regions in the sample image according to the movement order

FIG. 10

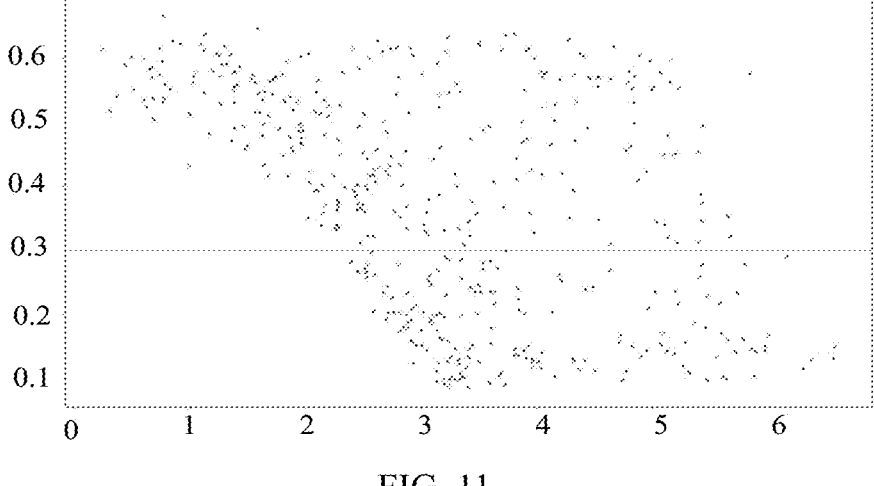

FIG. 11

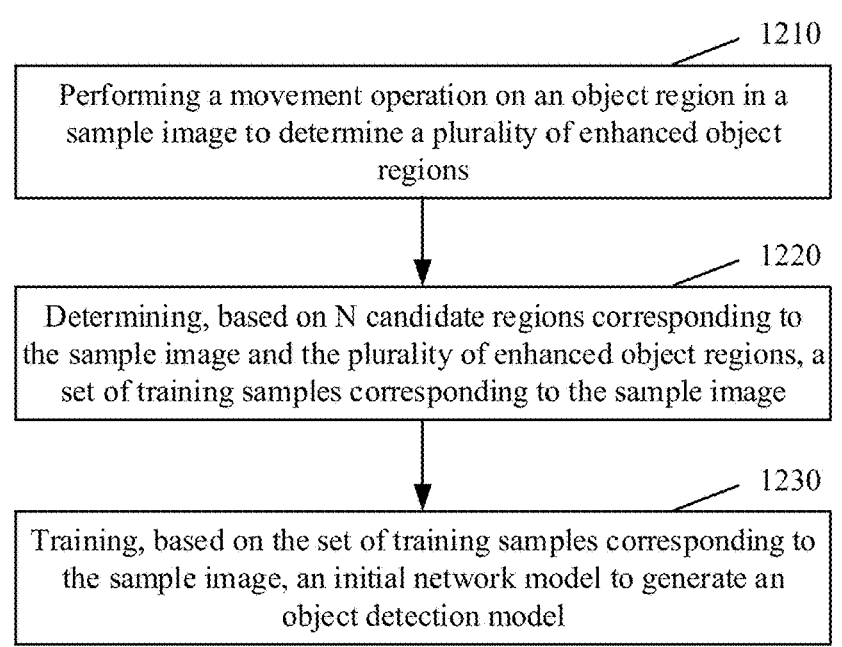

1210

Performing a movement operation on an object region in a sample image to determine a plurality of enhanced object regions

1220

Determining, based on N candidate regions corresponding to the sample image and the plurality of enhanced object regions, a set of training samples corresponding to the sample image

1230

Training, based on the set of training samples corresponding to the sample image, an initial network model to generate an object detection model

FIG. 12

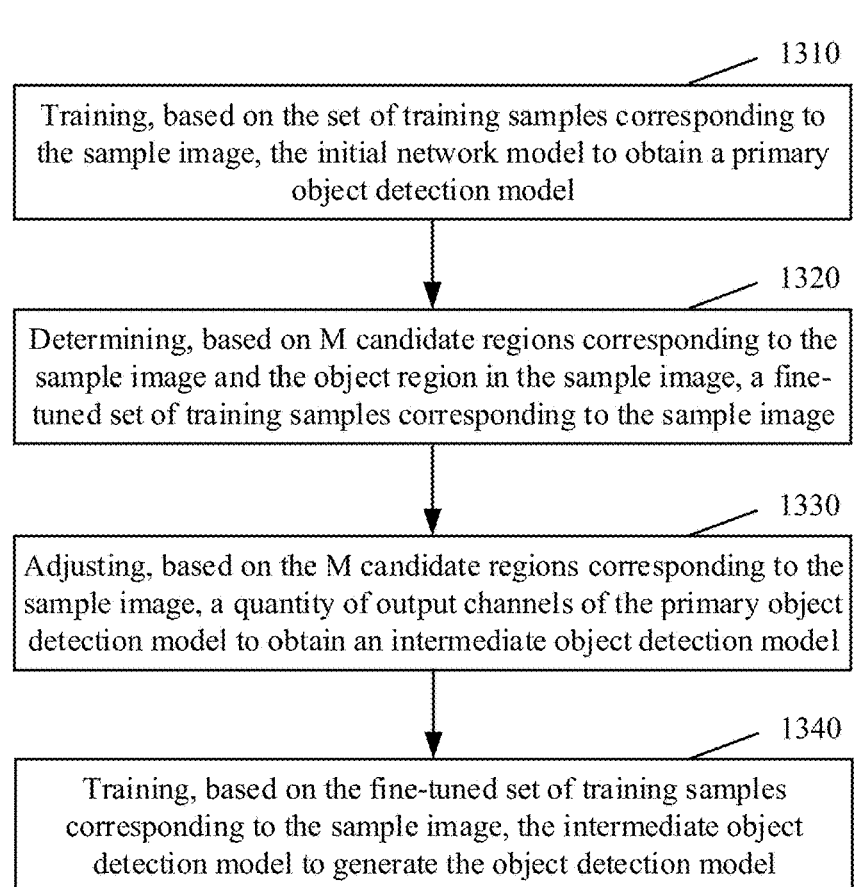

1310

Training, based on the set of training samples corresponding to the sample image, the initial network model to obtain a primary object detection model

1320

Determining, based on M candidate regions corresponding to the sample image and the object region in the sample image, a fine-tuned set of training samples corresponding to the sample image

1330

Adjusting, based on the M candidate regions corresponding to the sample image, a quantity of output channels of the primary object detection model to obtain an intermediate object detection model

1340

Training, based on the fine-tuned set of training samples corresponding to the sample image, the intermediate object detection model to generate the object detection model

Backbone
network                                    1x60

Conv 256x3x3x256    Conv 256x3x3x256          Conv 256x3x3x256    Conv 256x3x3x256
Conv 256x3x3x256    Conv 256x3x3x256          Conv 256x3x3x256    Conv 256x3x3x256
FC 256x(60x60x4)    FC 256x(60x60x15)         FC 256x(1000x4)     FC 256x(1000x15)

1x1000x4      1x1000x15
Regression   Classification    Regression    Classification    Regression   Classification
branch       branch            branch        branch            branch       branch

1610

Determining, based on distribution information of the object region in the sample image, a thermal distribution map corresponding to the sample image

1620

Determining, based on the thermal distribution map corresponding to the sample image and the N candidate regions corresponding to the sample image, the M candidate regions corresponding to the sample image

FIG. 16

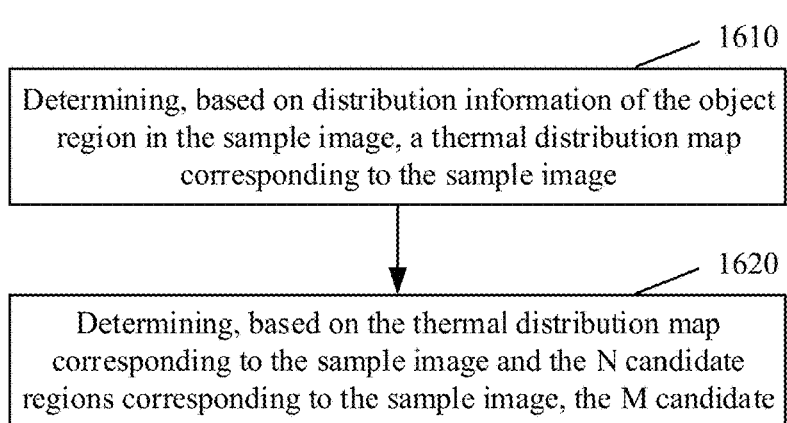

FIG. 17

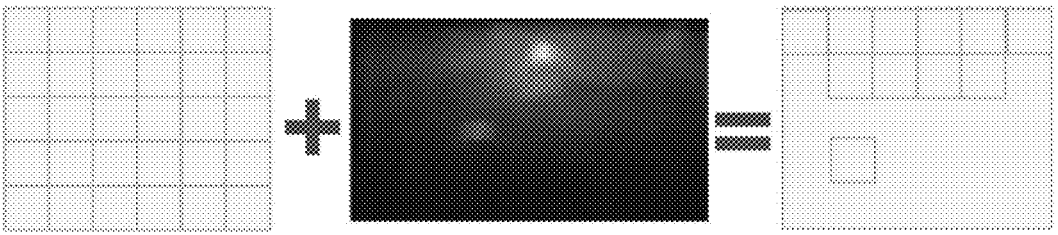

Determining an image to be detected

1920

Detecting the image to be detected by using an object detection model to determine an object region in the image to be detected

FIG. 19

METHOD AND APPARATUS FOR DETERMINING SET OF TRAINING SAMPLES, METHOD AND APPARATUS FOR TRAINING MODEL, AND METHOD AND APPARATUS FOR DETECTING OBJECT

CROSS-REFERENCE TO RELATED APPLICATION

This application claims the benefit under 35 U.S.C. § 119(a) of the filing date of Chinese Patent Application No. 202210987671.6, filed in the Chinese Patent Office on Aug. 17, 2022. The disclosure of the foregoing application is herein incorporated by reference in its entirety.

TECHNICAL FIELD

The present application relates to the field of deep learning technologies, and in particular, to a method and an apparatus for determining a set of training samples, a method and an apparatus for training a model, a method and an apparatus for detecting an object, a computer readable storage medium and an electronic device.

BACKGROUND

Object detection is an important application in the field of deep learning. With continuous development of deep learning technologies, there are more and more application scenarios for object detection. Object detection is widely used in scenarios such as intelligent transportation, video surveillance, and vehicle-road cooperation. Small object detection is an important branch and one of the difficulties in object detection. Specifically, a small object in an image to be detected has characteristics such as motion blur and susceptibility to occlusion, resulting in a low detection accuracy of a deep learning model in detecting the small object in the image to be detected.

SUMMARY

In view of this, embodiments of the present application provide a method and an apparatus for determining a set of training samples, a method and an apparatus for training a model, a method and an apparatus for detecting an object, a computer readable storage medium and an electronic device, to solve a problem of low detection accuracy of a deep learning model in detecting a small object in an image to be detected.

According to a first aspect, an embodiment of the present application provides a method for determining a set of training samples, including: performing a movement operation on an object region in a sample image to determine a plurality of enhanced object regions, where the plurality of enhanced object regions include a moved object region; and determining, based on a plurality of candidate regions corresponding to the sample image and the plurality of enhanced object regions, a set of training samples corresponding to the sample image to obtain an object detection model by training a network model based on the set of training samples corresponding to the sample image, where the set of training samples corresponding to the sample image includes at least one candidate region in the plurality of candidate regions corresponding to the sample image.

According to the first aspect of the present application, in some embodiments, the performing a movement operation on an object region in a sample image to determine a plurality of enhanced object regions includes: performing, based on a preset path, the movement operation on the object region in the sample image to determine the plurality of enhanced object regions.

According to the first aspect of the present application, in some embodiments, the performing, based on a preset path, the movement operation on the object region in the sample image to determine the plurality of enhanced object regions includes: performing, based on the preset path, a translation operation on the object region in the sample image to determine the plurality of enhanced object regions; and/or performing, based on the preset path, a rotation operation on the object region in the sample image to determine the plurality of enhanced object regions.

According to the first aspect of the present application, in some embodiments, the determining, based on a plurality of candidate regions corresponding to the sample image and the plurality of enhanced object regions, a set of training samples corresponding to the sample image includes: for each current enhanced object region in the plurality of enhanced object regions, calculating intersection over union between each of the plurality of candidate regions and the current enhanced object region to determine overlap degrees corresponding to the plurality of candidate regions respectively; determining, based on the overlap degrees corresponding to the plurality of candidate regions respectively and an overlap degree threshold, a set of training samples corresponding to the current enhanced object region; and determining, based on the set of training samples corresponding to the plurality of enhanced object regions respectively, the set of training samples corresponding to the sample image.

According to the first aspect of the present application, in some embodiments, the overlap degree threshold includes a fixed overlap degree threshold and a dynamic overlap degree threshold, and the determining, based on the overlap degrees corresponding to the plurality of candidate regions respectively and an overlap degree threshold, a set of training samples corresponding to the current enhanced object region includes: determining, based on the overlap degrees corresponding to the plurality of candidate regions respectively and the fixed overlap degree threshold, a first set of training samples corresponding to the current enhanced object region, where the first set of training samples includes at least one candidate region in the plurality of candidate regions; determining, based on the overlap degrees corresponding to the plurality of candidate regions respectively, an overlap degree corresponding to the current enhanced object region, and determining, based on the overlap degrees corresponding to the plurality of enhanced object regions respectively, a mean value and a standard deviation of the overlap degrees; determining, based on first sets of training samples corresponding to the plurality of enhanced object regions respectively, a stability coefficient of the current enhanced object region; determining, based on the mean value and the standard deviation of the overlap degrees, and the stability coefficient of the current enhanced object region, a dynamic overlap degree threshold of the current enhanced object region; determining, based on the overlap degrees corresponding to the plurality of candidate regions and the dynamic overlap degree threshold of the current enhanced object region, a second set of training samples corresponding to the current enhanced object region; and determining, based on the first set of training samples corresponding to the current enhanced object region and the second set of training samples corresponding to the current enhanced object region, the set of training samples corresponding to the current enhanced object region.

According to the first aspect of the present application, in some embodiments, before the performing a movement operation on an object region in a sample image to determine a plurality of enhanced object regions, the method further includes: for each current object region in the plurality of object regions in the sample image, performing pre-moving on the current object region to determine a plurality of pre-enhanced object regions corresponding to the current object region, where the plurality of pre-enhanced object regions include the current object region and a plurality of pre-moved object regions corresponding to the current object region; determining, based on the plurality of candidate regions corresponding to the sample image and the plurality of pre-enhanced object regions corresponding to the current object region, an overlap degree corresponding to the current object region; and determining, based on the overlap degrees corresponding to the plurality of object regions respectively, a movement order of the plurality of object regions to perform the movement operation on the plurality of object regions in the sample image according to the movement order.

According to the first aspect of the present application, in some embodiments, the determining, based on the plurality of candidate regions corresponding to the sample image and the plurality of pre-enhanced object regions corresponding to the current object region, an overlap degree corresponding to the current object region includes: for each of the plurality of pre-enhanced object regions corresponding to the current object region, calculating a sum of intersection to union between the current pre-enhanced object region and each of the plurality of candidate regions and calculating a sum of center distances between the current pre-enhanced object region and the plurality of candidate regions; determining, based on the sum of intersection to union corresponding to each of the plurality of pre-enhanced object regions, a sum of intersection to union corresponding to the current pre-enhanced object region and determining, based on the sum of center distances corresponding to the plurality of pre-enhanced object regions, a sum of center distances corresponding to the current pre-enhanced object region; and determining, based on a ratio of the sum of intersection to union corresponding to the current pre-enhanced object region to the sum of center distances corresponding to the current pre-enhanced object region, the overlap degree.

According to a second aspect, an embodiment of the present application provides a method for training a model, including: performing a movement operation on an object region in a sample image to determine a plurality of enhanced object regions, where the plurality of enhanced object regions include a moved object region; determining, based on N candidate regions corresponding to the sample image and the plurality of enhanced object regions, a set of training samples corresponding to the sample image, where the set of training samples corresponding to the sample image includes at least one candidate region in the N candidate regions, and N is a positive integer; and training, based on the set of training samples corresponding to the sample image, an initial network model to generate an object detection model, where the object detection model is used for detecting an object in an image to be detected.

According to the second aspect of the present application, in some embodiments, the training, based on the set of training samples corresponding to the sample image, an initial network model to generate an object detection model includes: training, based on the set of training samples corresponding to the sample image, the initial network model to obtain a primary object detection model; determining, based on M candidate regions corresponding to the sample image and the object region in the sample image, a fine-tuned set of training samples corresponding to the sample image, where M is a positive integer, M is less than N, and the fine-tuned set of training samples includes at least one candidate region in the M candidate regions; adjusting, based on the M candidate regions corresponding to the sample image, a quantity of output channels of the primary object detection model to obtain an intermediate object detection model; and training, based on the fine-tuned set of training samples corresponding to the sample image, the intermediate object detection model to generate the object detection model.

According to the second aspect of the present application, in some embodiments, before the determining, based on M candidate regions corresponding to the sample image and the object region in the sample image, a fine-tuned set of training samples corresponding to the sample image, the method further includes: determining, based on distribution information of the object region in the sample image, a thermal distribution map corresponding to the sample image; and determining, based on the thermal distribution map corresponding to the sample image and the N candidate regions corresponding to the sample image, the M candidate regions corresponding to the sample image.

According to a third aspect, an embodiment of the present application provides a method for detecting an object, including: determining an image to be detected; and detecting the image to be detected by using an object detection model to determine an object region in the image to be detected, where the object detection model is trained based on the method for training a model according to the second aspect.

According to a forth aspect, an embodiment of the present application provides an apparatus for determining a set of training samples, including: a moving module, configured to perform a movement operation on an object region in a sample image to determine a plurality of enhanced object regions, where the plurality of enhanced object regions include a moved object region; and a sample determination module, configured to determine, based on a plurality of candidate regions corresponding to the sample image and the plurality of enhanced object regions, a set of training samples corresponding to the sample image to obtain an object detection model by training a network model based on the set of training samples corresponding to the sample image, where the set of training samples corresponding to the sample image includes at least one candidate region in the plurality of candidate regions corresponding to the sample image.

According to a fifth aspect, an embodiment of the present application provides an apparatus for training a model, including: a moving module, configured to perform a movement operation on an object region in a sample image to determine a plurality of enhanced object regions, where the plurality of enhanced object regions include a moved object region; a sample determination module, configured to determine, based on N candidate regions corresponding to the sample image and the plurality of enhanced object regions, a set of training samples corresponding to the sample image, where the set of training samples corresponding to the sample image includes at least one candidate region in the N candidate regions, and N is a positive integer; and a training module, configured to train, based on the set of training samples corresponding to the sample image, an initial network model to generate an object detection model, where the object detection model is used for detecting an object in an image to be detected.

According to a sixth aspect, an embodiment of the present application provides an apparatus for detecting an object, including: an image determination module, configured to determine an image to be detected; and a detection module, configured to detect the image to be detected by using an object detection model to determine an object region in the image to be detected, where the object detection model is trained based on the method for training a model according to the second aspect.

According to a seventh aspect, an embodiment of the present application provides a computer-readable storage medium on which instructions are stored. When the instructions are executed by a processor of an electronic device, the electronic device may implement steps of the methods described in the first to third aspects.

According to an eighth aspect, an embodiment of the present application provides an electronic device, including: a memory, configured to store computer-executable instructions; and a processor configured to execute the computer-executable instructions to implement the methods described in the first to third aspects.

In the method for determining a set of training samples according to the embodiments of the present application, firstly a movement operation on an object region in a sample image is performed to determine a plurality of enhanced object regions including a moved object region. Then a set of training samples corresponding to the sample image is determined based on a plurality of candidate regions corresponding to the sample image and the plurality of enhanced object regions, so as to obtain an object detection model by training a network model based on the set of training samples corresponding to the sample image. Since a small-size object region (that is, a small object region) generally has a side length of dozens of pixels, a probability of the small object region being selected as a positive sample may be effectively improved by moving the small object region a few pixels. However, a large-size object region (that is, a large-size object region) generally has a side length of hundreds of pixels (or even thousands of pixels). Thus, a probability of the large-size object region being selected as a positive sample may not be effected by moving the large-size object region a few pixels. Therefore, a probability of the small object region being selected as a set of training samples is improved by performing a movement operation on the object region in the sample image without affecting sample selection of the large-size object region as much as possible, thereby improving detection accuracy of an object detection model, obtained by training a network model using the set of training samples, in detecting the small object.

BRIEF DESCRIPTION OF THE DRAWINGS

FIG. 4a is a sample image according to an embodiment of the present application.

FIG. 4b is a sample image according to another embodiment of the present application.

FIG. 4c is a sample image according to another embodiment of the present application.

FIG. 5 is a schematic flowchart of a method for determining a set of training samples according to another embodiment of the present application.

FIG. 6a is a schematic flowchart of a method for determining a set of training samples according to another embodiment of the present application.

FIG. 6b is a schematic flowchart of a method for determining a set of training samples according to another embodiment of the present application.

FIG. 7 is a schematic flowchart of a method for determining a set of training samples according to another embodiment of the present application.

FIG. 10 is a schematic diagram of a method for determining a set of training samples according to another embodiment of the present application.

FIG. 11 is a relationship diagram between a center distance of an object region and a candidate region, and a degree of classification confidence of an object.

FIG. 12 is a schematic flowchart of a method for training a model according to an embodiment of the present application.

FIG. 13 is a schematic flowchart of a method for training a model according to another embodiment of the present application.

FIG. 16 is a schematic flowchart of a method for training a model according to another embodiment of the present application.

FIG. 17 is a thermal distribution map corresponding to a sample image according to an embodiment of the present application.

FIG. 18 is a schematic diagram of generating M candidate regions.

FIG. 19 is a schematic flowchart of a method for detecting an object according to an embodiment of the present application.

DETAILED DESCRIPTION OF THE EMBODIMENTS

Figure 1:
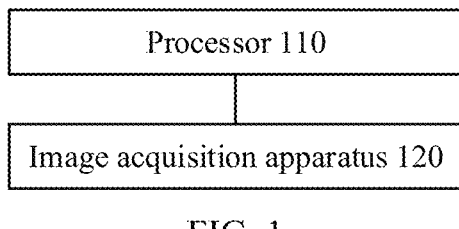
FIG. 1 is a schematic diagram of an application scenario of a method for determining a set of training samples according to an embodiment of the present application.

Technical solutions in embodiments of the present application are described clearly and completely below with reference to accompanying drawings of the embodiments of the present application. Apparently, the described embodiments are only a part, but not all of the embodiments of the present application. All other embodiments that may be obtained by those skilled in the art based on the embodiments in the present application without any inventive efforts fall into the protection scope of the present application.

Object detection is widely used in scenarios such as intelligent transportation, video surveillance, and vehicle-road cooperation. Small object detection is an important branch and one of difficulties in object detection. Specifically, a small object in an image to be detected has characteristics such as motion blur and susceptibility to occlusion. When using a deep learning model to detect an object region in an image to be detected, it is necessary to train an original deep learning model by using a set of training samples at first, and then use the trained deep learning model to detect the object region in the image to be detected, so that the object region (including object regions of various sizes) in the image to be detected may be determined.

However, in a process of selecting the set of training samples in the sample image, small objects in the sample image also have the characteristics such as motion blur and susceptibility to occlusion. As a result, a quantity of positive samples including the small objects in the set of training samples selected from the sample images is small. As a result, when the original deep learning model is trained by using the set of training samples, the original deep learning model is unable to fully learn features of the small objects, leading to a low detection accuracy of the trained deep learning model in detecting small object regions in the image to be detected.

Specifically, in the process of selecting the set of training samples in the sample images, due to problems such as small area proportion of the small objects in the sample images, susceptibility to occlusion, and motion blur, a proportion of the small objects contained in a set of training samples selected is inconsistent with that contained in the image to be detected in a practical applications. Therefore, a deep learning model trained by using a set of training samples obtained through a method of directly selecting positive samples from sample images (for example, Adaptive Training Sample Selection (ATSS) method) has a low detection accuracy for small objects.

Embodiments of the present application provide a method for determining a set of training samples, including: performing a movement operation on an object region in a sample image to determine a moved object region; and determining, based on a plurality of candidate regions corresponding to the sample image and the moved object region, a set of training samples corresponding to the sample image to obtain an object detection model by training a network model based on the set of training samples corresponding to the sample image.

Specifically, in the embodiments of the present application, a movement operation is performed on the object region in the sample image to simulate a moving state of a small-size or medium-sized object in an actual application scenario. Compared with a method of increasing a quantity of positive samples of small objects by reducing a selection threshold of a positive sample, by performing a movement operation on the object region in the sample image in the present application, the quantity of positive samples of small objects may be effectively increased with little or no impact on a quantity of positive samples of large objects. Specifically, a small-size object region (that is, a small object region) generally refers to an area with a side length of dozens of pixels. A probability of the small object region being selected as a positive sample may be effectively increased by moving the small object region a few pixels. However, a large-size object region (that is, a large-size object region) generally refers to an area with a side length of hundreds of pixels (or even thousands of pixels). A probability of the large-size object region being selected as a positive sample may not be effected by moving the large-size object region a few pixels. Therefore, the probability of the small object region being selected as a set of training samples is improved by performing a movement operation on the object region in the sample image without affecting sample selection of the large-size object region as much as possible, thereby improving detection accuracy of an object detection model, obtained by training a network model using the set of training samples, in detecting the small object.

Exemplary Scenario

FIG. 1 is a schematic diagram of an application scenario of a method for determining a set of training samples according to an embodiment of the present application. The scenario shown in FIG. 1 includes a processor 110 and an image acquisition apparatus 120 communicating with the processor 110. Specifically, the processor 110 is configured to perform a movement operation on an object region in a sample image to determine a plurality of enhanced object regions, where the plurality of enhanced object regions include a moved object region; and determine, based on a plurality of candidate regions corresponding to the sample image and the plurality of enhanced object regions, a set of training samples corresponding to the sample image to obtain an object detection model by training a network model based on the set of training samples corresponding to the sample image, where the set of training samples corresponding to the sample image includes at least one candidate region in the plurality of candidate regions corresponding to the sample image. The image acquisition apparatus 120 is configured to generate the sample image and send the sample image to the processor 110 so that the processor 110 may perform an operation described above.

In an embodiment of the present application, the processor 110 may also be configured to perform a movement operation on an object region in a sample image to determine a plurality of enhanced object regions, where the plurality of enhanced object regions include a moved object region; determine, based on N candidate regions corresponding to the sample image and the plurality of enhanced object regions, a set of training samples corresponding to the sample image, where the set of training samples corresponding to the sample image includes at least one candidate region in the N candidate regions, and N is a positive integer; and train, based on the set of training samples corresponding to the sample image, an initial network model to generate an object detection model, where the object detection model is used for detecting an object in an image to be detected.

Figure 2:
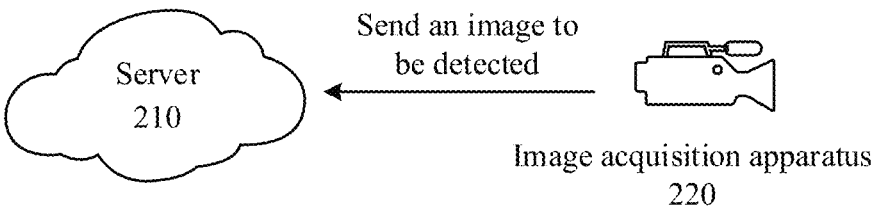
FIG. 2 is a schematic diagram of an application scenario of a method for detecting an object according to an embodiment of the present application.

FIG. 2 is a schematic diagram of an application scenario of a method for detecting an object according to an embodiment of the present application. The scenario shown in FIG. 2 is an intelligent transportation scenario. Specifically, the method for detecting an object may be applied to a vehicle-road cooperation system in an intelligent transportation scenario. The vehicle-road coordination system includes a server 210 and an image acquisition apparatus 220 which communicates with the server 210. Specifically, the image acquisition apparatus 220 is used to collect images of a road and vehicles and pedestrians on the road, and send the collected images to the server 210. After receiving images to be detected collected by the image acquisition apparatus 220, the server 210 uses an object detection model to detect the images to be detected and determine object regions in the images to be detected. The object detection model is obtained based on a method for training a model according to the present application.

Exemplary Method

Figure 3:
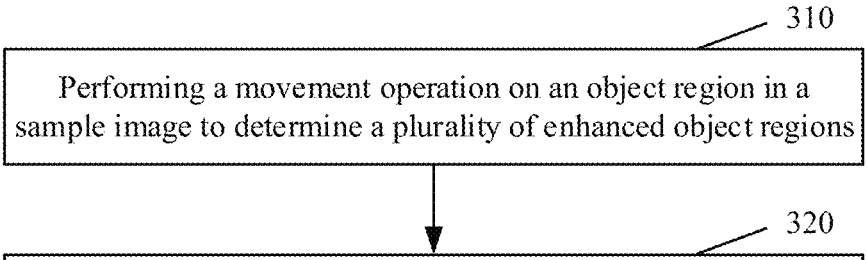
FIG. 3 is a schematic flowchart of a method for determining a set of training samples according to an embodiment of the present application.

FIG. 3 is a schematic flowchart of a method for determining a set of training samples according to an embodiment of the present application. As shown in FIG. 3, the method for determining a set of training samples includes the following steps.

Step 310: performing a movement operation on an object region in a sample image to determine a plurality of enhanced object regions.

Specifically, the sample image is an original image used to train a network model. Partial image regions containing the object region are extracted from the sample image and input to the network model, so as to train the network model and obtain an object detection model. The object region may be a large object region, a small object region, or a region of a medium-size object (i.e., a medium object region). The large object region is relatively larger than the small object region, and an area of the large object region is generally more than ten times that of the small object region. The plurality of enhanced object regions include a moved object region. Specifically, the plurality of enhanced object regions may include a plurality of moved object regions obtained by multiple times of movement operations. The plurality of enhanced object regions may also include object regions that have not been moved.

Exemplarily, the large object region may include 960*480 pixel points, and the small object region may include 60*30 pixel points, that is, an area of the large object region is 16 times that of the small object region. A region with an area between the area of the large object region and the area of the small object region is the medium object region.

Specifically, the movement operation may be a translation operation, or a rotation operation, or other types of movement operations, which are not specified in the present application.

Step 320: determining, based on a plurality of candidate regions corresponding to the sample image and the plurality of enhanced object regions, a set of training samples corresponding to the sample image to obtain an object detection model by training a network model based on the set of training samples corresponding to the sample image.

Specifically, the set of training samples corresponding to the sample image includes at least one candidate region in the plurality of candidate regions corresponding to the sample image. The set of training samples is a collection of training samples. That is, if a candidate region is selected as a positive sample, then the candidate region is a training sample in the set of training samples. The network model may be a deep learning network model. The object detection model is used to detect an object region in the image to be detected, to determine the object region in the image to be detected.

In practical application, the plurality of candidate regions may be determined through candidate boxes. That is, the plurality of candidate regions are obtained by laying a plurality of candidate boxes on the sample image. Each of the plurality of candidate box corresponds to a candidate region.

Exemplarily, the step of determining, based on a plurality of candidate regions corresponding to the sample image and the plurality of enhanced object regions, a set of training samples corresponding to the sample image may be executed as follows: for each of the plurality of enhanced object regions, calculating an overlapping area of each of the plurality of candidate regions and the enhanced object region respectively; and determining a candidate region, of which the overlapping area satisfies a preset threshold of intersection, as a training sample. The step of determining, based on a plurality of candidate regions corresponding to the sample image and the plurality of enhanced object regions, a training sample corresponding to the sample image may also be executed as follows: calculating intersection over union between each of the plurality of candidate regions and the enhanced object region; and determining a candidate region, of which the Intersection over Union (IOU) satisfies a preset IOU threshold, as the training sample.

Exemplarily, FIG. 4a is a sample image according to an embodiment of the present application. Regions which are surrounded by a plurality of solid lines and are uniformly distributed in FIG. 4a are a plurality of candidate regions, and regions surrounded by dashed lines in FIG. 4a are object regions. A dashed rectangular region on the left may be a small-sized object region, that is, a region containing an image of a small object; and a dashed rectangular region on the upper right may be a medium-sized object region, that is, a region containing an image of an medium-sized object; and a dashed rectangular region on the lower right may be a large-size object region, that is, a region containing an image of a large object.

Exemplarily, FIG. 4b is a sample image according to another embodiment of the present application. Specifically, FIG. 4b shows a sample image obtained after performing a movement operation on the object regions in FIG. 4a. As shown in FIG. 4a and FIG. 4b, after the three object regions in FIG. 4a are translated to the right, the image shown in FIG. 4b is obtained.

Exemplarily, FIG. 4c is a sample image according to another embodiment of the present application. Specifically, FIG. 4c shows a sample image obtained after performing a movement operation on the object regions in FIG. 4b. As shown in FIG. 4b and FIG. 4c, after the three object regions in FIG. 4b are translated downward, the image shown in FIG. 4c is obtained.

A probability of a small object region being selected as a training sample is improved by performing a movement operation on the object region in the sample image without affecting sample selection of the large-size object region as much as possible, thereby improving detection accuracy of an object detection model, obtained by training a network model using the set of training samples, in detecting the small object.

FIG. 5 is a schematic flowchart of a method for determining a set of training samples according to another embodiment of the present application. The embodiment shown in FIG. 5 is extended based on the embodiment shown in FIG. 3. A difference between the embodiment shown in FIG. 5 and the embodiment shown in FIG. 3 will be described below, and the similarities will not be repeated.

As shown in FIG. 5, in this embodiment of the present application, the step of performing a movement operation on an object region in a sample image to determine a plurality of enhanced object regions includes the following steps.

Step 510: performing, based on a preset path, the movement operation on the object region in the sample image to determine the plurality of enhanced object regions.

Specifically, the preset path may be a preset moving path for performing a movement operation on the object region.

In practical application, the preset path may be a moving path of the small object obtained based on empirical statistics. For example, in an intelligent transportation scenario, vehicles are driving from left to right. Therefore, the preset path may be configured to be a path from left to right. That is, the object region is moved along a path from left to right. Exemplarily, a quantity of time of the step of performing, based on a preset path, the movement operation on the object region in the sample image may be one time or several times. The present application does not specify the quantity of times of the movement operation. Every time the movement operation is performed, a moved object region may be obtained. For example, a moved object region is obtained by moving the object region by 3 pixels from left to right, and another moved object region is obtained by moving the object region by 5 pixels from left to right, and so on.

The step of performing, based on a preset path, the movement operation on the object region in the sample image to determine a plurality of enhanced object regions further simulates a moving state of a small or medium object in practical applications, so that the set of training samples is closer to the image to be detected, thereby further improving the detection accuracy of the object detection model, obtained by training a network model using the set of training samples, in detecting the small object.

FIG. 6a is a schematic flowchart of a method for determining a set of training samples according to another embodiment of the present application. FIG. 6b is a schematic flowchart of a method for determining a set of training samples according to another embodiment of the present application. The embodiments shown in FIG. 6a and FIG. 6b is extended based on the embodiment shown in FIG. 5. The differences between the embodiments shown in FIG. 6a and FIG. 6b and the embodiment shown in FIG. 5 will be described below, and the similarities will not be repeated.

As shown in FIG. 6a and FIG. 6b, in this embodiment of the present application, the performing, based on a preset path, the movement operation on the object region in the sample image to determine the plurality of enhanced object regions includes the following steps.

Step 610: performing, based on a preset path, a translation operation on the object region in the sample image to determine the plurality of enhanced object regions.

Step 620: performing, based on a preset path, a rotation operation on the object region in the sample image to determine the plurality of enhanced object regions.

In practical application, the performing the movement operation on an object region in a sample image to determine a plurality of enhanced object regions may be performed as Step 610, that is, performing, based on a preset path, a translation operation on the object region in the sample image to determine the plurality of enhanced object regions; and may also be performed as Step 620, that is, performing, based on a preset path, a rotation operation on the object region in the sample image to determine the plurality of enhanced object regions; and may also performed as Step 610 and Step 620, that is, performing, based on a preset path, a translation operation on the object region in the sample image to determine the plurality of enhanced object regions first, and then performing, based on a preset path, a rotation operation on the object region in the sample image to determine the plurality of enhanced object regions; or performing, based on a preset path, a rotation operation on the object region in the sample image to determine the plurality of enhanced object regions first, and then performing, based on a preset path, a translation operation on the object region in the sample image to determine the plurality of enhanced object regions; or performing Step 610 or Step 620 for multiple times to obtain the plurality of enhanced object regions.

The movement operation performed on the object regions in the sample image may be the translation and/or the rotation operation performed on the object regions in the sample image, which enriches types of the movement operation and further increases a quantity of candidate regions containing the small objects in the set of training samples. Thus, the detection accuracy of the object detection model, obtained by training a network model using the set of training samples, in detecting small objects is further improved.

FIG. 7 is a schematic flowchart of a determination set of training samples method according to another embodiment of the present application. The embodiment shown in FIG. 7 is extended based on the embodiment shown in FIG. 3. A difference between the embodiment shown in FIG. 7 and the embodiment shown in FIG. 3 will be described below, and the similarities will not be repeated.

As shown in FIG. 7, in this embodiment of the present application, the step of determining, based on a plurality of candidate regions corresponding to the sample image and the plurality of enhanced object regions, a set of training samples corresponding to the sample image includes the following steps.

Step 710: for each current enhanced object region in the plurality of enhanced object regions, calculating intersection over union between each of the plurality of candidate regions and the current enhanced object region to determine overlap degrees corresponding to the plurality of candidate regions respectively.

Specifically, the overlap degrees corresponding to the plurality of candidate regions respectively may be obtained by separately calculating the intersection over union between each of the plurality of candidate regions and the current enhanced object region, that is, the overlap degree corresponding to the candidate region may be the intersection over union between the candidate region and the current enhanced object region.

Step 720: determining, based on the overlap degrees corresponding to the plurality of candidate regions respectively and an overlap degree threshold, a set of training samples corresponding to the current enhanced object region.

Specifically, the overlap degree threshold may be a preset threshold. By comparing the overlap degrees corresponding to the plurality of candidate regions respectively and the overlap degree threshold, the set of training samples corresponding to the current enhanced object region may be obtained. Exemplarily, if an overlap degree corresponding to a candidate region is greater than or equal to the overlap degree threshold, the candidate region may be determined as a training sample corresponding to the current enhanced object region. If the overlap degree corresponding to the candidate region is lower than the overlap degree threshold, the candidate region may not be determined as the training sample corresponding to the current enhanced object region. For the current enhanced object region, the intersection over union between each of the plurality of candidate regions and the current enhanced object region may be calculated, that is, overlap degrees corresponding to the plurality of candidate regions may be obtained. Therefore, the set of training samples corresponding to the current enhanced object region may include at least one training sample or no training sample. Specifically, if the overlap degrees corresponding to the plurality of candidate regions are all lower than the overlap degree threshold, the set of training samples corresponding to the current enhanced object region may not include any training sample, that is, an empty set.

Step 730: determining, based on the set of training samples corresponding to the plurality of enhanced object regions respectively, the set of training samples corresponding to the sample image.

Specifically, each current enhanced object region corresponds to a set of training samples, and the set of training samples corresponding to the sample image includes a plurality of sets of training samples corresponding to the plurality of enhanced object regions.

The method of determining, based on the overlap degrees corresponding to the plurality of candidate regions respectively and an overlap degree threshold, a set of training samples corresponding to the current enhanced object region is simple and efficient.

Figure 8:
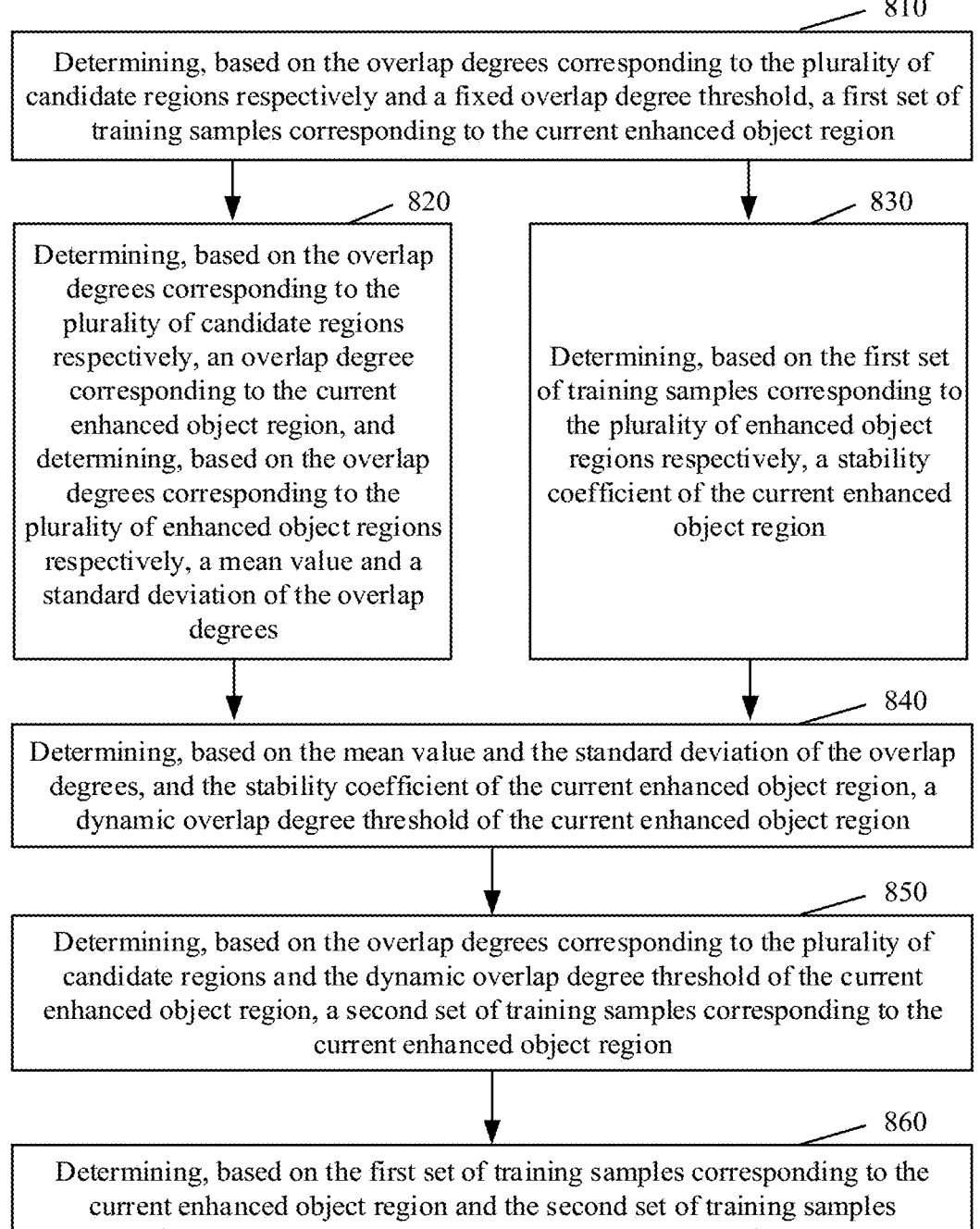
FIG. 8 is a schematic flowchart of a method for determining a set of training samples according to another embodiment of the present application.

FIG. 8 is a schematic flowchart of a method for determining a set of training samples according to another embodiment of the present application. The embodiment shown in FIG. 8 is extended based on the embodiment shown in FIG. 7. A difference between the embodiment shown in FIG. 8 and the embodiment shown in FIG. 7 will be described below, and the similarities will not be repeated.

As shown in FIG. 8, in this embodiment of the present application, the steps of the determining, based on the overlap degrees corresponding to the plurality of candidate regions respectively and an overlap degree threshold, a set of training samples corresponding to the current enhanced object region includes the following steps.

Step 810: determining, based on the overlap degrees corresponding to the plurality of candidate regions respectively and a fixed overlap degree threshold, a first set of training samples corresponding to the current enhanced object region.

Specifically, the first set of training samples includes at least one candidate region in the plurality of candidate regions. The first set of training samples is a set of first training samples. That is, if a candidate region is selected as a positive sample, the candidate region is a first training sample in the first set of training samples. The fixed overlap degree threshold may be a preset threshold. By comparing the overlap degrees respectively corresponding to the plurality of candidate regions and the fixed overlap degree threshold, the first set of training samples corresponding to the current enhanced object region may be obtained. Exemplarily, if a overlap degree corresponding to a candidate region is greater than or equal to the fixed overlap degree threshold, the candidate region may be determined as a first training sample corresponding to the current enhanced object region. If the overlap degree corresponding to the candidate region is lower than the fixed overlap degree threshold, the candidate region may not be determined as the first training sample corresponding to the current enhanced object region.

Step 820: determining, based on the overlap degrees corresponding to the plurality of candidate regions respectively, an overlap degree corresponding to the current enhanced object region, and determining, based on the overlap degrees corresponding to the plurality of enhanced object regions respectively, a mean value and a standard deviation of the overlap degrees.

Specifically, the overlap degrees respectively corresponding to the plurality of candidate regions are intersection over union between the plurality of candidate regions and the current enhanced object region. The overlap degree corresponding to the current enhanced object region may be a sum of the overlap degrees respectively corresponding to the plurality of candidate regions, or may be an average value of the overlap degrees respectively corresponding to the plurality of candidate regions. The mean value of the overlap degrees is an average of the overlap degrees respectively corresponding to the plurality of enhanced object regions. The standard deviation of the overlap degrees is a standard deviation of the overlap degrees respectively corresponding to the plurality of enhanced object regions.

Step 830: determining, based on the first set of training samples corresponding to the plurality of enhanced object regions respectively, a stability coefficient of the current enhanced object region.

Specifically, the first set of training samples corresponding to the current enhanced object region includes at least one candidate region in the plurality of candidate regions, and the first set of training samples corresponding to the current enhanced object region is obtained by comparing the overlap degrees respectively corresponding to the plurality of candidate regions and the fixed overlap degree threshold. Therefore, the first set of training samples is at least one candidate region that satisfies the fixed overlap degree threshold in the plurality of candidate regions. The step of determining, based on the first set of training samples corresponding to the plurality of enhanced object regions respectively, a stability coefficient of the current enhanced object region may be executed as follows: if there is an intersection between the first set of training samples respectively corresponding to the plurality of enhanced object regions, the stability coefficient may be set as a first value; and if there is no intersection between the first set of training samples respectively corresponding to the plurality of enhanced object regions, the stability coefficient may be set as a second value, and the first value is greater than the second value.

Step 840: determining, based on the mean value and the standard deviation of the overlap degrees, and the stability coefficient of the current enhanced object region, a dynamic overlap degree threshold of the current enhanced object region.

Exemplarily, the dynamic overlap degree threshold of the current enhanced object region may be calculated by the following formula (1).

$$IOU_{thre} = IOU_{mean} + a \times IOU_{Sstd} \tag{1}$$

Therein, $IOU_{thre}$ represents the dynamic overlap degree threshold of the current enhanced object region, $IOU_{mean}$ represents the mean value of the overlap degrees, $IOU_{Sstd}$ represents the standard deviation of the overlap degrees, and a represents the stability coefficient of the current enhanced object region. If there is an intersection between the first set of training samples respectively corresponding to the plurality of enhanced object regions, the stability coefficient of the plurality of enhanced object regions may be set as 1; if there is no intersection between the first set of training samples respectively corresponding to the plurality of enhanced object regions, the stability coefficient of the plurality of enhanced object regions may be set as 0.1.

Figure 9A:
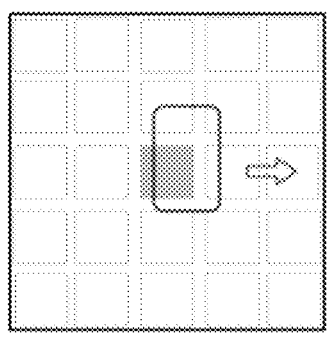
FIG. 9a to FIG. 9d are sample images according to another embodiment of the present application.
Figure 9B:
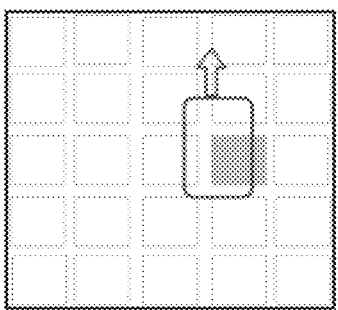
Figure 9C:
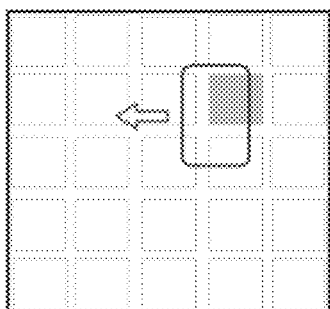
Figure 9D:
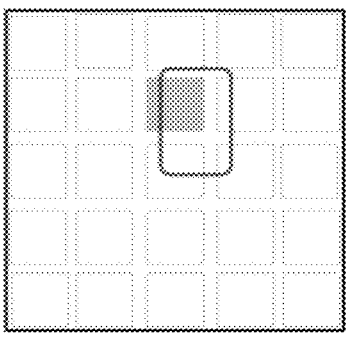

FIG. 9a to FIG. 9d are sample images according to another embodiment of the present application. As shown in FIG. 9a to FIG. 9d, hollow square regions which are uniformly distributed represent the plurality of candidate regions, rectangular regions represent the object regions, solid square regions represent the first set of training samples, and arrows represent moving directions of the object regions. That is, the object region in FIG. 9a is translated to the right to obtain the object region in FIG. 9b; the object region in FIG. 9b is translated upward to obtain the object region in FIG. 9c; and the object region in FIG. 9c is translated to the left to obtain the object region in FIG. 9d. As shown in FIG. 9a to FIG. 9d, it can be seen that there is no intersection between the first set of training samples respectively corresponding to the current enhanced object regions after each movement. Therefore, the stability coefficient of the plurality of enhanced object regions may be set as 0.1.

Figure 9E:
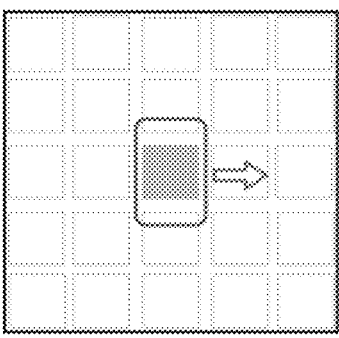
FIG. 9e to FIG. 9h are sample images according to another embodiment of the present application.
Figure 9F:
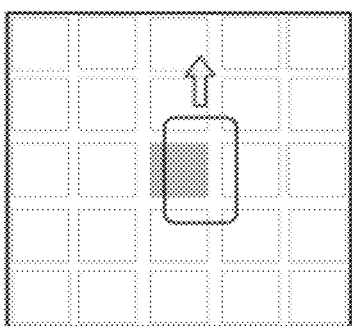
Figure 9G:
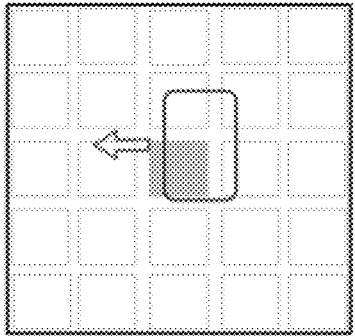
Figure 9H:
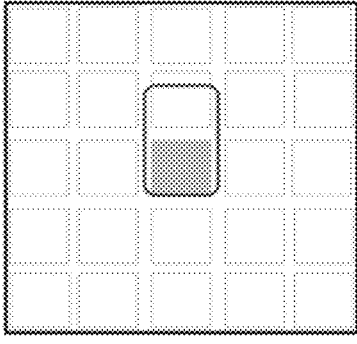

FIG. 9e to FIG. 9h are sample images according to another embodiment of the present application. As shown in FIG. 9e to FIG. 9h, hollow square regions which are uniformly distributed represent the plurality of candidate regions, rectangular regions represent the object regions, solid square regions represent the first set of training samples, and arrows represent moving directions of the object regions. That is, the object region in FIG. 9e is translated to the right to obtain the object region in FIG. 9f; the object region in FIG. 9f is translated upward to obtain the object region in FIG. 9g; and the object region in FIG. 9g is translated to the left to obtain the object region in FIG. 9h. As shown in FIG. 9e to FIG. 9h, it can be seen that there is an intersection between the first set of training samples respectively corresponding to the current enhanced object region after each movement. Therefore, the stability coefficient of the plurality of enhanced object regions may be set as 1.

Step 850: determining, based on the overlap degrees corresponding to the plurality of candidate regions and the dynamic overlap degree threshold of the current enhanced object region, a second set of training samples corresponding to the current enhanced object region.

Specifically, the second set of training samples includes a plurality of second samples. If an overlap degree corresponding to a candidate region is greater than or equal to the dynamic overlap degree threshold of the current enhanced object region, the candidate region may be determined as a second training sample. If the overlap degree corresponding to the candidate region is lower than the dynamic overlap degree threshold of the current enhanced object region, the candidate region may not be determined as the second training sample.

Step 860: determining, based on the first set of training samples corresponding to the current enhanced object region and the second set of training samples corresponding to the current enhanced object region, the set of training samples corresponding to the current enhanced object region.

Exemplarily, the set of training samples corresponding to the current enhanced object region includes the first set of training samples and the second set of training samples. That is, the first set of training samples and the second set of training samples are combined into the set of training samples corresponding to the current enhanced object region.

By calculating the dynamic overlap degree threshold and using the dynamic overlap degree threshold to determine the set of training samples, a more appropriate threshold may be determined for each current enhanced object region, and detection accuracy of the object detection model obtained by training the network model using the set of training samples in detecting the small object may be further improved.

FIG. 10 is a schematic diagram of a method for determining a set of training samples according to another embodiment of the present application. The embodiment shown in FIG. 10 is extended based on the embodiment shown in FIG. 3. A difference between the embodiment shown in FIG. 10 and the embodiment shown in FIG. 3 will be described below, and the similarities will not be repeated.

As shown in FIG. 10, in this embodiment of the present application, before the performing a movement operation on an object region in a sample image to determine a plurality of enhanced object regions, the method further includes the following steps.

Step 1010: performing pre-moving on the current object region to determine a plurality of pre-enhanced object regions corresponding to the current object region.

Specifically, the plurality of pre-enhanced object regions include the current object region and pre-moved object regions corresponding to the current object region.

Exemplarily, for each current object region in the plurality of object regions in the sample image, the plurality of pre-enhanced object regions corresponding to the current object region are determined by performing pre-moving on the current object region.

Step 1020: determining, based on the plurality of candidate regions corresponding to the sample image and the plurality of pre-enhanced object regions corresponding to the current object region, an overlap degree corresponding to the current object region.

Specifically, the overlap degree corresponding to the current object region may be calculated as follows: for each of the plurality of pre-enhanced object regions corresponding to the current object region, calculating intersection over union and a center distance between the current pre-enhanced object region and each of the plurality of candidate regions to obtain intersection over union and a center distance corresponding to the current pre-enhanced object region; calculating a sum of the intersection over union of each of the plurality of pre-enhanced object regions corresponding to the current object region and a sum of center distances between the current pre-enhanced object region and the plurality of candidate regions; and taking a ratio of the sum of the intersection over union to the sum of the center distances as the overlap degree corresponding to the current object region.

According to the present application, center distances between an object region of a small object and candidate regions are statistically analyzed to obtain a relationship between the center distances between the object region of a small object and the candidate regions, and a degree of classification confidence of the object, as shown in FIG. 11. A horizontal coordinate in FIG. 11 represents the center distance between the object region of a small object and the candidate regions, and a vertical coordinate represents the degree of classification confidence of the object. It can be seen from FIG. 11 that the smaller the center distance between the object region of a small object and the candidate region is, the higher the degree of classification confidence of the object will be; and the larger the center distance between the object region of a small object and the candidate region is, the lower the degree of classification confidence of the object will be. Therefore, by taking the ratio of the sum of the intersection over union to the sum of the center distance as the overlap degree of the current object region, the degree of classification confidence of the object may be improved.

Step 1030: determining, based on the overlap degrees corresponding to the plurality of object regions respectively, a movement order of the plurality of object regions to perform the movement operation on the plurality of object regions in the sample image according to the movement order.

Specifically, the determining, based on the overlap degrees corresponding to the plurality of object regions, a movement order of the plurality of object regions may refers to arranging the plurality of object regions according to an order of the overlap degrees from small to large, to obtain the movement order of the plurality of object regions.

Exemplarily, the movement order of the plurality of object regions may be obtained by the following formula (2).

$$SortRefList = \left[\frac{IOU_{sum}}{CTD_{sum}}\right] \tag{2}$$

Therein, SortRefList represents the movement order, and $IOU_{sum}$ represents the sum of the intersection over union of each of the plurality of pre-enhanced object regions corresponding to the current object region. $CTD_{sum}$ represents the sum of the center distances of the plurality of pre-enhanced object regions corresponding to the current object region.

By determining the movement order of the plurality of object regions and performing the movement operation on the plurality of object regions in the sample image according to the movement order, the movement order of plurality of object regions may be determined first in an offline state, thus reducing time for subsequent determination of the set of training samples and improving efficiency of subsequent extraction of the set of training samples.

FIG. 12 is a schematic flowchart of a method for training a model according to an embodiment of the present application. As shown in FIG. 12, the method for training a model of the embodiment of the present application includes the following steps.

Step 1210: performing a movement operation on an object region in a sample image to determine a plurality of enhanced object regions.

Specifically, the plurality of enhanced object regions include a moved object region.

Step 1220: determining, based on N candidate regions corresponding to the sample image and the plurality of enhanced object regions, a set of training samples corresponding to the sample image.

Specifically, the set of training samples corresponding to the sample image includes at least one candidate region in the N candidate regions, and N is a positive integer.

Exemplarily, implementations of Step 1210 and Step 1220 may be referred to embodiments of determining the set of training samples described above and will not be repeated here.

Step 1230: training, based on the set of training samples corresponding to the sample image, an initial network model to generate an object detection model.

Specifically, the object detection model is used for detecting objects in an image to be detected. The initial network model may be a deep learning model.

A probability of the small object region being selected as a set of training samples is improved by performing a movement operation on the object region in the sample image without affecting sample selection of the large-size object region as much as possible, thereby improving detection accuracy of an object detection model, obtained by training a network model using the set of training samples, in detecting the small object.

FIG. 13 is a schematic flowchart of a method for training a model according to another embodiment of the present application. The embodiment shown in FIG. 13 is extended based on the embodiment shown in FIG. 12. A difference between the embodiment shown in FIG. 13 and the embodiment shown in FIG. 12 will be described below, and the similarities will not be repeated.

As shown in FIG. 13, in this embodiment of the present application, the training, based on the set of training samples corresponding to the sample image, an initial network model to generate an object detection model includes the following steps.

Step 1310: training, based on the set of training samples corresponding to the sample image, the initial network model to obtain a primary object detection model.

Specifically, the initial network model is trained using the set of training samples until the initial network model converges to obtain the primary object detection model.

Step 1320: determining, based on M candidate regions corresponding to the sample image and the object region in the sample image, a fine-tuned set of training samples corresponding to the sample image.

Specifically, M is a positive integer, M is less than N, and the fine-tuned set of training samples includes at least one candidate region in the M candidate regions and the N candidate regions. The M candidate regions may be candidate regions unevenly distributed. The N candidate regions may be candidate regions uniformly distributed.

In practical application, the plurality of candidate regions may be determined by laying candidate boxes. Exemplarily, by laying M candidate boxes, the M candidate regions are obtained. By laying N candidate boxes, the N candidate regions are obtained. A laying density of the N candidate boxes is greater than that of the M candidate boxes.

Exemplarily, a new candidate box may be generated based on the N candidate boxes and the M candidate boxes, as well as candidate box parameters. Specifically, M candidate boxes may be determined in the N candidate boxes first, then the M candidate boxes may be extended, and each candidate box in the M candidate boxes may be extended to a plurality of candidate boxes. In practical application, extended candidate boxes may be generated by calculating index values of the N candidate boxes.

Specifically, for the N candidate boxes uniformly distributed, the candidate box parameters may be set as: anchor_scale=[4], anchor_offset=[0, 0], that is, each anchor point creates a candidate box. As a purpose of the present application is to improve precision of small objects, for an anchor point, more small candidate boxes may be laid, that is, the candidate box parameters may be set as: anchor_scale=[1|2], anchor_offset=[0,0]|[0.5,0.5]] to be the parameters of the M candidate box. Namely, a current anchor point will generate 5 candidate boxes, where the first candidate box is named a general candidate box (that is, one of the N candidate boxes) for maintaining detection accuracy of objects of various sizes, and the remaining 4 candidate boxes are named extended candidate boxes (that is, one of the M candidate boxes) for improving detection accuracy of small objects.

Step 1330: adjusting, based on the M candidate regions corresponding to the sample image, a quantity of output channels of the primary object detection model to obtain an intermediate object detection model.

Exemplarily, by adjusting the quantity of output channels of the primary object detection model (that is, pruning the primary object detection model), the model after adjustment of the quantity of output channels is determined as the intermediate object detection model. A pruning ratio of the primary object detection model may be determined according to an actual demand.

Figure 14:
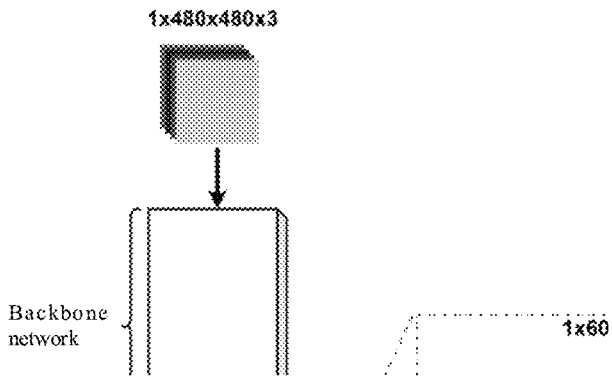
FIG. 14 is a schematic diagram of adjustment to a quantity of output channels of a model according to an embodiment of the present application.

FIG. 14 is a schematic diagram of adjustment to a quantity of output channels of a model according to an embodiment of the present application. As shown in FIG. 14, a size of a training sample is 1×480×480×3. After the training sample passes through a backbone network of a primary object detection model, the size of the obtained image is 1×60× 60×256. Then, after the image whose size is 1×60×60×256 is processed through a regression branch, the quantity of output channels is 1×3600×4. After the image whose size is 1×60×60×256 is processed through a classification branch, the quantity of output channels is 1×3600×15. Through adjustment to the quantity of output channels of the primary object detection model, the intermediate object detection model is obtained with the quantity of output channels through the regression branch being 1×3600×4 and the quantity of output channels through the classification branch being 1×3600×15. Specifically, the regression branch may include a convolution layer and a fully connected layer, with the convolution layer represented by Conv and the fully connected layer represented by FC. Parameters of a convolution layer (Conv) of the regression branch in the primary object detection model may be 256×3×3×256, and parameters of a fully connected layer (FC) of the regression branch may be 256×(60×60×4). Parameters of a convolution layer (Conv) of the classification branch in the primary object detection model may be 256×3×3×256, and parameters of a fully connected layer (FC) of the classification branch may be 256×(60×60×15). Parameters of a convolution layer (Conv) of the regression branch in the intermediate object detection model may be 256×3×3×256, and parameters of a fully connected layer (FC) of the regression branch may be 256×(1000×4). Parameters of a convolution layer (Conv) of the classification branch in the intermediate object detection model may be 256×3×3×256, and parameters of a fully connected layer (FC) of the classification branch may be 256×(1000×15).

Figure 15:
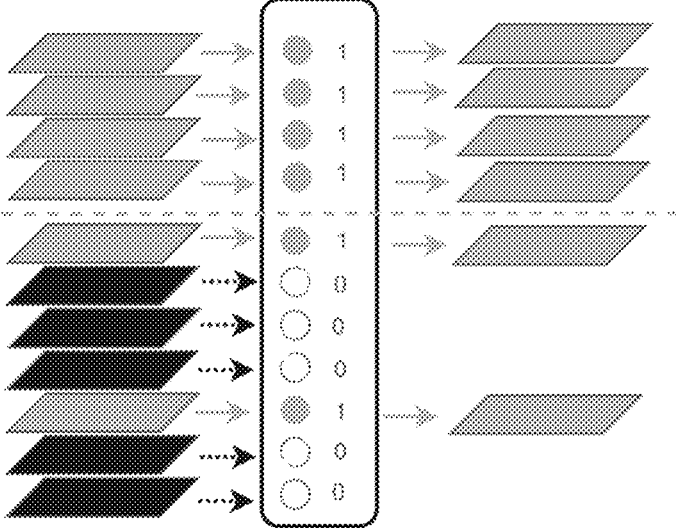
FIG. 15 is a schematic diagram of model pruning according to an embodiment of the present application.

FIG. 15 is a schematic diagram of model pruning according to an embodiment of the present application. As shown in FIG. 15, candidate boxes above a dashed line represent general candidate boxes, and it is not necessary to prune the primary object detection model according to the general candidate boxes. Candidate boxes below the dashed line represent extended candidate boxes and the primary object detection model is pruned according to the extended candidate boxes. It can be seen according to FIG. 15 that a part of the extended candidate boxes (solid black) is clipped.

Step 1340: training, based on the fine-tuned set of training samples corresponding to the sample image, the intermediate object detection model to generate the object detection model.

In practical application, if the M candidate regions unevenly distributed and the object regions are directly used to determine the training samples, difficulty in model train-ing will be increased and training efficiency of the model will be affected. If only the N candidate regions evenly distributed and the object regions are used to determine the training samples, detection accuracy of the trained model on small objects will be low. If a quantity of the N candidate regions uniformly distributed is increased only for improving the detection accuracy of the model on small objects (that is, reducing an area of each candidate region), the training efficiency of the model will be low. Therefore, according to the present application, an initial network model is trained by using the set of training samples corresponding to the sample image first to obtain the primary object detection model, and then the quantity of output channels of the primary object detection model is adjusted by using the idea of model pruning, based on the M candidate regions corresponding to the sample image, to obtain the intermediate object detection model. The intermediate object detection model is trained by using the fine-tuned set of training samples to generate the object detection model. That is, not only the detection accuracy of object detection model in detecting small objects is improved, but also the training efficiency of the model is improved.

FIG. 16 is a schematic flowchart of a method for training a model according to another embodiment of the present application. The embodiment shown in FIG. 16 is extended based on the embodiment shown in FIG. 13. A difference between the embodiment shown in FIG. 16 and the embodiment shown in FIG. 13 will be described below, and the similarities will not be repeated.

As shown in FIG. 16, in this embodiment of the present application, before the step of determining, based on M candidate regions corresponding to the sample image and the object region in the sample image, a fine-tuned set of training samples corresponding to the sample image, the method further includes the following steps.

Step 1610: determining, based on distribution information of the object region in the sample image, a thermal distribution map corresponding to the sample image.

Specifically, the distribution information of the object region in the sample image is generally represented as that small object regions are distributed in an edge area of the sample image, and large object regions or medium object regions are distributed in a center area of the sample image.

FIG. 17 is a thermal distribution map corresponding to a sample image according to an embodiment of the present application. The thermal distribution map corresponding to the sample image may be obtained by processing the sample image through a heat map extraction model, or may be extracted through methods such as grayscale threshold. As shown in FIG. 17, a region enclosed by a white rectangular box (i.e., a high-frequency region) may be a small object region.

Step 1620: determining, based on the thermal distribution map corresponding to the sample image and the N candidate regions corresponding to the sample image, the M candidate regions corresponding to the sample image.

Specifically, a high frequency region may be obtained according to the thermal distribution map corresponding to the sample image. By laying N candidate boxes, candidate boxes corresponding to the high frequency region of the thermal distribution map in the N candidate boxes are determined to be M candidate boxes.

FIG. 18 is a schematic diagram of generating M candidate regions. As shown in FIG. 18, the image on the left of FIG. 18 is an image including 30 candidate boxes (used to determine 30 candidate regions), the image in the middle of FIG. 18 is a thermal distribution map corresponding to the sample image, and the image on the right of FIG. 18 is an image including 11 candidate boxes (used to determine 11 candidate regions).

Based on the distribution information of the object regions in the sample image, the thermal distribution map corresponding to the sample image is determined. And then the M candidate regions corresponding to the sample image are determined based on the thermal distribution map corresponding to the sample image and the N candidate regions corresponding to the sample image. More candidate regions may be expanded based on the M candidate regions (that is, the regions where small objects appear more frequently), thereby improving a probability of the small object regions being selected as the training sample and detection accuracy of the object detection model, obtained by training a network model using the set of training samples, in detecting the small object.

FIG. 19 is a schematic flowchart of a method for detecting an object according to an embodiment of the present application. As shown in FIG. 19, the method for detecting an object of the embodiment in the present application includes the following steps.

Step 1910: determining an image to be detected.

Specifically, the image to be detected may be an image containing object regions of various sizes.

Step 1920: detecting the image to be detected by using an object detection model to determine an object region in the image to be detected.

Specifically, the object detection model is trained based on the method for training a model in the embodiments described above.

In the embodiments described above, by performing a movement operation on the object regions in the sample image, a probability of the small object regions being selected as the set of training samples is improved without affecting sample selection of the large-size object regions as much as possible, thereby improving detection accuracy of the object detection model, obtained by training a network model using the set of training samples, in detecting the small object. Therefore, by using the object detection model trained by the method for training a model in the embodiment described above to detect the image to be detected and determine the object regions in the image to be detected, detection accuracy in detecting the object regions of the small objects is improved.

Method embodiments of the present application are described in detail with reference to FIG. 3 to FIG. 19. Apparatus embodiments of the present application will be described in detail with reference to FIG. 20 to FIG. 24 in the following. It should be understood that the description of the method embodiments corresponds to the description of the apparatus embodiments. Thus, a part not described in detail may be referred to the previous method embodiments.

Exemplary Apparatus

Figure 20:
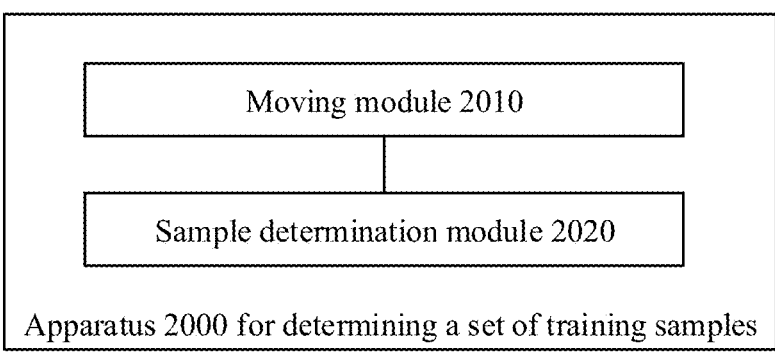
FIG. 20 is a schematic structural diagram of an apparatus for determining a set of training samples according to an embodiment of the present application.

FIG. 20 is a schematic structural diagram of an apparatus for determining a set of training samples according to an embodiment of the present application. As shown in FIG. 20, according to an embodiment of the present application, the apparatus 2000 for determining a set of training samples includes: a moving module 2010 and a sample determination module 2020.

Specifically, the moving module 2010 is configured to perform a movement operation on an object region in a sample image to determine a plurality of enhanced object regions, where the plurality of enhanced object regions include a moved object region. The sample determination module 2020 is configured to determine, based on a plurality of candidate regions corresponding to the sample image and the plurality of enhanced object regions, a set of training samples corresponding to the sample image to obtain an object detection model by training a network model based on the set of training samples corresponding to the sample image, where the set of training samples corresponding to the sample image includes at least one candidate region in the plurality of candidate regions corresponding to the sample image.

In an embodiment of the present application, the moving module 2010 is further configured to perform, based on a preset path, the movement operation on the object region in the sample image to determine the plurality of enhanced object regions.

In an embodiment of the present application, the moving module 2010 is further configured to perform, based on the preset path, a translation operation on the object region in the sample image to determine the plurality of enhanced object regions; and/or perform, based on the preset path, a rotation operation on the object region in the sample image to determine the plurality of enhanced object regions.

In an embodiment of the present application, the sample determination module 2020 is further configured to, for each current enhanced object region in the plurality of enhanced object regions, calculate intersection over union between each of the plurality of candidate regions and the current enhanced object region to determine overlap degrees corresponding to the plurality of candidate regions respectively; determine, based on the overlap degrees corresponding to the plurality of candidate regions respectively and an overlap degree threshold, a set of training samples corresponding to the current enhanced object region; and determine, based on the set of training samples corresponding to the plurality of enhanced object regions respectively, the set of training samples corresponding to the sample image.

In an embodiment of the present application, the overlap degree threshold includes a fixed overlap degree threshold and a dynamic overlap degree threshold. The sample determination module 2020 is further configured to determine, based on the overlap degrees corresponding to the plurality of candidate regions respectively and the fixed overlap degree threshold, a first set of training samples corresponding to the current enhanced object region, where the first set of training samples includes at least one candidate region in the plurality of candidate regions; determine, based on the overlap degrees corresponding to the plurality of candidate regions respectively, an overlap degree corresponding to the current enhanced object region, and determine, based on the overlap degrees corresponding to the plurality of enhanced object regions respectively, a mean value and a standard deviation of the overlap degrees; determine, based on the first set of training samples corresponding to the plurality of enhanced object regions respectively, a stability coefficient of the current enhanced object region; determine, based on the mean value and the standard deviation of the overlap degrees, and the stability coefficient of the current enhanced object region, the dynamic overlap degree threshold of the current enhanced object region; determine, based on the overlap degrees corresponding to the plurality of candidate regions and the dynamic overlap degree threshold of the current enhanced object region, a second set of training samples corresponding to the current enhanced object region; and determine, based on the first set of training samples corresponding to the current enhanced object region and the second set of training samples corresponding to the current enhanced object region, the set of training samples corresponding to the current enhanced object region.

Figure 21:
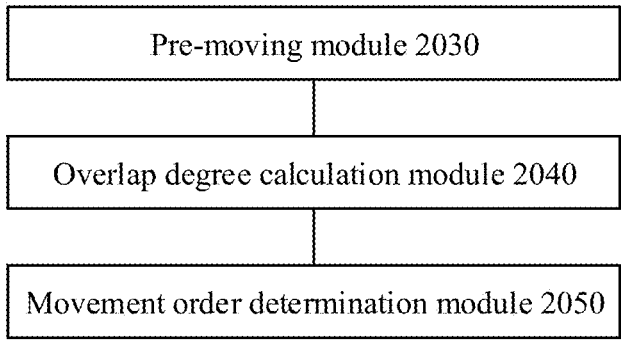
FIG. 21 is a schematic structural diagram of an apparatus for determining a set of training samples according to another embodiment of the present application.

FIG. 21 is a schematic structural diagram of an apparatus for determining a set of training samples according to another embodiment of the present application. The embodiment shown in FIG. 21 is extended based on the embodiment shown in FIG. 20. A difference between the embodiment shown in FIG. 21 and the embodiment shown in FIG. 20 will be described below, and the similarities will not be repeated.

As shown in FIG. 21, according to an embodiment of the present application, the apparatus 2000 for determining a set of training samples further includes: a pre-moving module 2030, an overlap degree calculation module 2040 and a movement order determination module 2050.

Specifically, the pre-moved module 2030 is configured to, for each current object region in the plurality of object regions in the sample image, perform pre-moving on the current object region to determine a plurality of pre-enhanced object regions corresponding to the current object region, where the plurality of pre-enhanced object regions include the current object region and a plurality of pre-moved object regions corresponding to the current object region. The overlap degree calculation module 2040 is configured to determine, based on the plurality of candidate regions corresponding to the sample image and the plurality of pre-enhanced object regions corresponding to the current object region, an overlap degree corresponding to the current object region. The movement order determination module 2050 is configured to determine, based on the overlap degrees corresponding to the plurality of object regions respectively, a movement order of the plurality of object regions to perform the movement operation on the plurality of object regions in the sample image according to the movement order.

In an embodiment of the present application, the overlap degree calculation module 2040 is further configured to, for each of the plurality of pre-enhanced object regions corresponding to the current object region, calculate a sum of intersection over union between the current pre-enhanced object region and each of the plurality of candidate regions and calculate a sum of center distances between the current pre-enhanced object region and the plurality of candidate regions; determine, based on the sum of intersection over union corresponding to each of the plurality of pre-enhanced object regions, a sum of intersection over union corresponding to the current pre-enhanced object region and determine, based on the sum of center distances corresponding to each of the plurality of pre-enhanced object regions, a sum of center distances corresponding to the current pre-enhanced object region; and determine, based on a ratio of the sum of intersection over union corresponding to the current pre-enhanced object region to the sum of center distances corresponding to the current pre-enhanced object region, the overlap degree.

Figure 22:
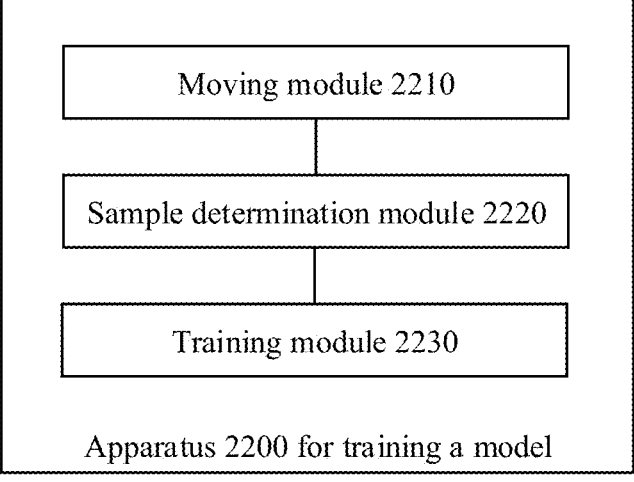
FIG. 22 is a schematic structural diagram of an apparatus for training a model according to an embodiment of the present application.

FIG. 22 is a schematic structural diagram of an apparatus for training a model according to an embodiment of the present application. As shown in FIG. 22, according to an embodiment of the present application, the apparatus 2200 for training a model includes: a moving module 2210, a sample determination module 2220 and a training module 2230.

Specifically, the moving module 2210 is configured to perform a movement operation on an object region in a sample image to determine a plurality of enhanced object regions, where the plurality of enhanced object regions include a moved object region. The sample determination module 2220 is configured to determine, based on N candidate regions corresponding to the sample image and the plurality of enhanced object regions, a set of training samples corresponding to the sample image, where the set of training samples corresponding to the sample image includes at least one candidate region in the N candidate regions, and N is a positive integer. The training module 2230 is configured to train, based on the set of training samples corresponding to the sample image, an initial network model to generate an object detection model, where the object detection model is used for detecting an object in an image to be detected.

In an embodiment of the present application, the training module 2230 is further configured to train, based on the set of training samples corresponding to the sample image, the initial network model to obtain a primary object detection model; determine, based on M candidate regions, the N candidate regions corresponding to the sample image and the object regions in the sample image, a fine-tuned set of training samples corresponding to the sample image, where M is a positive integer, M is less than N, and the fine-tuned set of training samples includes at least one candidate region in the M candidate regions; adjust, based on the M candidate regions corresponding to the sample image, a quantity of output channels of the primary object detection model to obtain an intermediate object detection model; and train, based on the fine-tuned set of training samples corresponding to the sample image, the intermediate object detection model to generate the object detection model.

Figure 23:
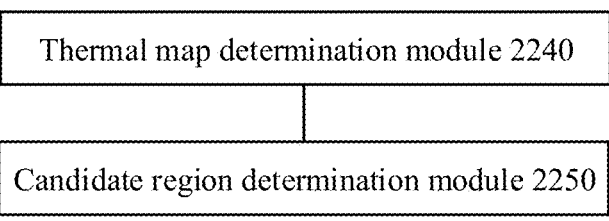
FIG. 23 is a schematic structural diagram of an apparatus for training a model according to another embodiment of the present application.

FIG. 23 is a schematic structural diagram of an apparatus for training a model according to another embodiment of the present application. The embodiment shown in FIG. 23 is extended based on the embodiment shown in FIG. 22. A difference between the embodiment shown in FIG. 23 and the embodiment shown in FIG. 22 will be described below, and the similarities will not be repeated.

As shown in FIG. 23, according to an embodiment of the present application, the apparatus 2200 for training a model includes: a thermal map determination module 2240 and a candidate region determination module 2250.

Specifically, the thermal map determination module 2240 is configured to determine, based on distribution information of the object region in the sample image, a thermal distribution map corresponding to the sample image. The candidate region determination module 2250 is configured to determine, based on the thermal distribution map corresponding to the sample image and the N candidate regions corresponding to the sample image, the M candidate regions corresponding to the sample image.

Figure 24:
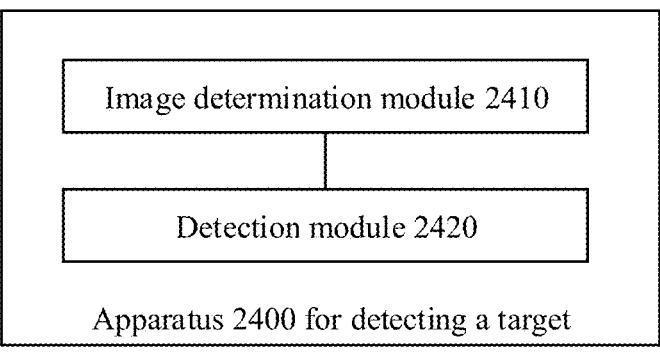
FIG. 24 is a schematic structural diagram of an apparatus for detecting an object according to an embodiment of the present application.

FIG. 24 is a schematic structural diagram of an apparatus for detecting an object according to another embodiment of the present application. As shown in FIG. 24, according to an embodiment of the present application, the apparatus 2400 for detecting an object includes: an image determination module 2410 and a detection module 2420.

Specifically, the image determination module 2410 is configured to determine an image to be detected. The detection module 2420 is configured to detect the image to be detected by using an object detection model to determine an object region in the image to be detected, where the object detection model is trained based on the method for training a model according to the embodiments described above.

Operation and functions of the moving module 2010, the sample determination module 2020, the pre-moving module 2030, the overlap degree calculation module 2040 and the movement order determination module 2050 in the apparatus 2000 for determining a set of training samples, and the moving module 2210, the sample determination module 2220, the training module 2230, the thermal map determination module 2240 and the candidate region determination module 2250 in the apparatus 2200 for training a model, and the image determination module 2410 and the detection module 2420 in the apparatus 2400 for detecting an object which are provided in FIG. 20 to FIG. 24 may be referred to the methods provided in FIG. 3 to FIG. 19 described above. In order to avoid repetition, it will not be repeated here.

Exemplary Electronic Device

Figure 25:
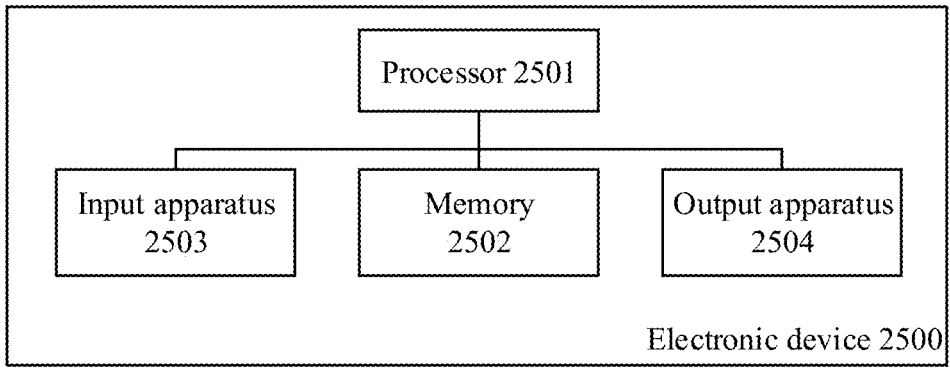
FIG. 25 is a schematic structural diagram of an electronic device according to an embodiment of the present application.

FIG. 25 is a schematic structural diagram of an electronic device according to an embodiment of the present application. As shown in FIG. 25, the electronic device 2500 includes: one or more processors 2501 and a memory 2502, and computer program instructions stored in the memory 2502. When the computer program instructions are run by the processor 2501, a method according to any of the embodiments described above will be implemented by the processor 2501.

The processor 2501 may be a Central Processing Unit (CPU) or other forms of processing unit with data transfer capabilities and/or instruction execution capabilities, and can control other components in the electronic device to perform desired functions.

The memory 2502 may include one or more computer program products, and the computer program products may include various forms of computer readable storage medium, such as a volatile memory and/or a non-volatile memory. The volatile memory may include, for example, a Random Access Memory (RAM) and/or a Cache memory. The non-volatile memory may include, for example, a Read Only Memory (ROM), a hard disk, a flash memory, etc. One or more computer program instructions may be stored on a computer readable storage medium, and the processor 2501 may run the program instructions to implement the steps in the method of each of the embodiments of the present application described above and/or other desired functions.

In an example, the electronic device 2500 may also include an input apparatus 2503 and an output apparatus 2504, which are interconnected by a bus system and/or other form of connection mechanism (not shown in FIG. 25).

In addition, the input apparatus 2503 may also include, for example, a keyboard, a mouse, a microphone, etc.

The output apparatus 2504 may output various information to the outside. The output apparatus 2504 may include, for example, a display, a speaker, a printer, and a communication network and a remote output apparatus to which it is connected.

Of course, for simplicity, only some of the components of the electronic device 2500 that are relevant to the present application are shown in FIG. 25, omitting components such as the bus, input apparatus/output interface, etc. In addition to this, depending on a specific application, the electronic device 2500 may also include any other appropriate components.

Exemplary Computer Readable Storage Medium

In addition to the methods and devices described above, embodiments of the present application may also be computer program products, including computer program instructions that, when run by the processor, cause the processor to perform steps of methods in any of the embodiments described above.

The computer program product may be written in any combination of one or more programming languages, including object-oriented programming languages, such as Java, C++, etc., as well as conventional procedural programming languages, such as "C" language or similar programming languages, for the purpose of performing the operations of the present application embodiment. The program code may be executed entirely on a computing device of the user, partly on the computing device of the user, as a stand-alone package, partly on the computing device of the user, partly on a remote computing device, or entirely on the remote computing device or server.

In addition, embodiments of the present application may also be a computer readable storage medium on which computer program instructions are stored. When the computer program instructions are run by a processor, the processor perform the steps in the method in the "Exemplary Method" section described above in the present specification in accordance with the various embodiments of the present application.

Computer readable storage medium may adopt any combination of one or more readable media. The readable medium may be a readable signal medium or a readable storage medium. The readable storage media may, for example, include, but are not limited to, electrical, magnetic, optical, electromagnetic, infrared, or semiconductor systems, an apparatus or a device, or any combination of the above. More specific examples of readable storage medium (a non-exhaustive list) include: electrical connection with one or more wires, a portable disk, a hard disk, a RAM, a ROM, an Erasable Programmable Read Only Memory (EPROM), or a flash memory, an optical fiber, a Compact Disk Read Only Memory (CD-ROM), an optical storage device, a magnetic storage device, or any suitable combination of the above.

The above describes basic principles of the present application in combination with specific embodiments. However, it should be pointed out that the advantages, superiority, effects, etc. mentioned in the present application are only examples rather than limitations, and cannot be considered as necessary for each embodiment of the present application. In addition, the specific details disclosed above are only for the purpose of example and ease of understanding, rather than limitation, and the above details do not limit the application must be implemented with the above specific details.

The block diagrams of devices, apparatus, equipment and systems referred to in the present application are only illustrative examples and are not intended to require or imply that they must be connected, arranged or configured in the manner indicated in the box diagrams. Such means, apparatus, devices, and systems may be connected, arranged and configured in any manner, as will be recognized by those skilled in the art. Words such as "including", "containing", "having", etc., are open-ended words that mean "including but not limited to" and are used interchangeably with them. The words "or" and "and" refer to the words "and/or" and may be used interchangeably with them unless the context clearly indicates otherwise. The term "such" as used here refers to the phrase "such as but not limited to" and is used interchangeably with it.

It should also be noted that the components or steps in the apparatus, device and methods of the present application may be broken down and/or recombined. Such decomposition and/or recombination shall be deemed to be equivalent to the present application.

The above description of the disclosed aspects are provided so that those skilled in the art may manufacture or use the present application. Various modifications to these aspects are quite obvious to those skilled in the art, and the general principles defined herein may be applied to other aspects without leaving a scope of the present application. Accordingly, the present application is not intended to be limited to the aspects shown herein, but rather to the broadest scope consistent with the principles and novel features disclosed herein.

The above description has been given for the purposes of illustration and description. In addition, this description is not intended to limit embodiments of the present application to the form disclosed herein. Although a plurality of example aspects and embodiments have been discussed above, certain variations, modifications, changes, additions, and sub-combinations will be recognized by those skilled in the art.

The above is only a better embodiment of the present application and is not intended to limit the present application. Any modification, equivalent substitution, etc. made within the spirit and principles of the present application shall fall in a protection scope of the present application.

What is claimed is:

1. A method for determining a set of training samples, comprising: performing a movement operation on an object region in a sample image to determine a plurality of enhanced object regions, wherein the plurality of enhanced object regions comprise a moved object region, wherein the movement operation comprises translating or rotating the object region by a predetermined amount relative to the sample image; and determining, based on a plurality of candidate regions corresponding to the sample image and the plurality of enhanced object regions, a set of training samples corresponding to the sample image to obtain an object detection model by training a network model based on the set of training samples corresponding to the sample image, wherein the set of training samples corresponding to the sample image comprises at least one candidate region in the plurality of candidate regions corresponding to the sample image, wherein determining the set of training samples based on the plurality of candidate regions corresponding to the sample image and the plurality of enhanced object regions comprises: for each current enhanced object region in the plurality of enhanced object regions, calculating a respective intersection over union between each of the plurality of candidate regions and the current enhanced object region to determine overlap degrees corresponding to the plurality of candidate regions respectively; determining, based on the overlap degrees corresponding to the plurality of candidate regions respectively and an overlap degree threshold, a set of training samples corresponding to the current enhanced object region; and determining, based on the set of training samples corresponding to the plurality of enhanced object regions respectively, the set of training samples corresponding to the sample image, thereby affecting an accuracy level of the object detection model.

2. The method according to claim 1, wherein performing the movement operation on the object region in the sample image to determine the plurality of enhanced object regions comprises:

performing, based on a preset path, the movement operation on the object region in the sample image to determine the plurality of enhanced object regions.

3. The method according to claim 1, wherein the overlap degree threshold comprises a fixed overlap degree threshold and a dynamic overlap degree threshold, and wherein determining, based on the overlap degrees corresponding to the plurality of candidate regions respectively and an overlap degree threshold, a set of training samples corresponding to the current enhanced object region comprises:

determining, based on the overlap degrees corresponding to the plurality of candidate regions respectively and the fixed overlap degree threshold, a first set of training samples corresponding to the current enhanced object region, wherein the first set of training samples comprises at least one candidate region in the plurality of candidate regions;

determining, based on the overlap degrees corresponding to the plurality of candidate regions respectively, an overlap degree corresponding to the current enhanced object region, and determining, based on the overlap degrees corresponding to the plurality of enhanced object regions respectively, a mean value and a standard deviation of the overlap degrees;

determining, based on the first set of training samples corresponding to the plurality of enhanced object regions respectively, a stability coefficient of the current enhanced object region;

determining, based on the mean value and the standard deviation of the overlap degrees, and the stability coefficient of the current enhanced object region, a dynamic overlap degree threshold of the current enhanced object region;

determining, based on the overlap degrees corresponding to the plurality of candidate regions and the dynamic overlap degree threshold of the current enhanced object region, a second set of training samples corresponding to the current enhanced object region; and determining, based on the first set of training samples corresponding to the current enhanced object region and the second set of training samples corresponding to the current enhanced object region, the set of training samples corresponding to the current enhanced object region.

4. The method according to claim 1, before performing the movement operation on the object region in the sample image to determine the plurality of enhanced object regions, further comprising:

for each current object region in a plurality of object regions in the sample image, performing pre-moving on the current object region to determine a plurality of pre-enhanced object regions corresponding to the current object region, wherein the plurality of pre-enhanced object regions comprise the current object region and a plurality of pre-moved object regions corresponding to the current object region;

determining, based on the plurality of candidate regions corresponding to the sample image and the plurality of pre-enhanced object regions corresponding to the current object region, an overlap degree corresponding to the current object region; and determining, based on overlap degrees corresponding to the plurality of object regions respectively, a movement order of the plurality of object regions to perform the movement operation on the plurality of object regions in the sample image according to the movement order.

5. The method according to claim 1, wherein the object detection model is configured to detect an object in an image.

6. The method according to claim 1, wherein the object detection model is configured to:

determine an image to be detected; and detect the image to determine the object region in the image.

7. The method of claim 1, wherein the movement operation on the object region in the sample image is determined based on simulating a moving state of an object in the sample image.

8. One or more non-transitory computer-readable storage media encoded with instructions that, when executed by one or more computers, cause the one or more computers to perform operations comprising: performing a movement operation on an object region in a sample image to determine a plurality of enhanced object regions, wherein the plurality of enhanced object regions comprise a moved object region, wherein the movement operation comprises translating or rotating the object region by a predetermined amount relative to the sample image; and determining, based on a plurality of candidate regions corresponding to the sample image and the plurality of enhanced object regions, a set of training samples corresponding to the sample image to obtain an object detection model by training a network model based on the set of training samples corresponding to the sample image, wherein the set of training samples corresponding to the sample image comprises at least one candidate region in the plurality of candidate regions corresponding to the sample image, wherein determining the set of training samples based on the plurality of candidate regions corresponding to the sample image and the plurality of enhanced object regions comprises: for each current enhanced object region in the plurality of enhanced object regions, calculating a respective intersection over union between each of the plurality of candidate regions and the current enhanced object region to determine overlap degrees corresponding to the plurality of candidate regions respectively; determining, based on the overlap degrees corresponding to the plurality of candidate regions respectively and an overlap degree threshold, a set of training samples corresponding to the current enhanced object region; and determining, based on the set of training samples corresponding to the plurality of enhanced object regions respectively, the set of training samples corresponding to the sample image, thereby affecting an accuracy level of the object detection model.

9. The one or more non-transitory computer-readable storage media according to claim 8, wherein performing the movement operation on the object region in the sample image to determine the plurality of enhanced object regions comprises:

performing, based on a preset path, the movement operation on the object region in the sample image to determine the plurality of enhanced object regions.

10. The one or more non-transitory computer-readable storage media according to claim 8, wherein the overlap degree threshold comprises a fixed overlap degree threshold and a dynamic overlap degree threshold, and wherein determining, based on the overlap degrees corresponding to the plurality of candidate regions respectively and an overlap degree threshold, a set of training samples corresponding to the current enhanced object region comprises:

determining, based on the overlap degrees corresponding to the plurality of candidate regions respectively and the fixed overlap degree threshold, a first set of training samples corresponding to the current enhanced object region, wherein the first set of training samples comprises at least one candidate region in the plurality of candidate regions;

determining, based on the overlap degrees corresponding to the plurality of candidate regions respectively, an overlap degree corresponding to the current enhanced object region, and determining, based on the overlap degrees corresponding to the plurality of enhanced object regions respectively, a mean value and a standard deviation of the overlap degrees;

determining, based on the first set of training samples corresponding to the plurality of enhanced object regions respectively, a stability coefficient of the current enhanced object region;

determining, based on the mean value and the standard deviation of the overlap degrees, and the stability coefficient of the current enhanced object region, a dynamic overlap degree threshold of the current enhanced object region;

determining, based on the overlap degrees corresponding to the plurality of candidate regions and the dynamic overlap degree threshold of the current enhanced object region, a second set of training samples corresponding to the current enhanced object region; and determining, based on the first set of training samples corresponding to the current enhanced object region and the second set of training samples corresponding to the current enhanced object region, the set of training samples corresponding to the current enhanced object region.

11. The one or more non-transitory computer-readable storage media according to claim 8, before performing the movement operation on the object region in the sample image to determine the plurality of enhanced object regions, further comprising:

for each current object region in a plurality of object regions in the sample image, performing pre-moving on the current object region to determine a plurality of pre-enhanced object regions corresponding to the current object region, wherein the plurality of pre-enhanced object regions comprise the current object region and a plurality of pre-moved object regions corresponding to the current object region;

determining, based on the plurality of candidate regions corresponding to the sample image and the plurality of pre-enhanced object regions corresponding to the current object region, an overlap degree corresponding to the current object region; and determining, based on overlap degrees corresponding to the plurality of object regions respectively, a movement order of the plurality of object regions to perform the movement operation on the plurality of object regions in the sample image according to the movement order.

12. The one or more non-transitory computer-readable storage media according to claim 8, wherein the object detection model is configured to:

determine an image to be detected; and detect the image to determine the object region in the image.

13. The one or more non-transitory computer-readable storage media of claim 8, wherein the movement operation on the object region in the sample image is determined based on simulating a moving state of an object in the sample image.

14. A system comprising: one or more computers and one or more storage devices on which are stored instructions that are operable, when executed by the one or more computers, to cause the one or more computers to perform operations comprising: performing a movement operation on an object region in a sample image to determine a plurality of enhanced object regions, wherein the plurality of enhanced object regions comprise a moved object region, wherein the movement operation comprises translating or rotating the object region by a predetermined amount relative to the sample image; and determining, based on a plurality of candidate regions corresponding to the sample image and the plurality of enhanced object regions, a set of training samples corresponding to the sample image to obtain an object detection model by training a network model based on the set of training samples corresponding to the sample image, wherein the set of training samples corresponding to the sample image comprises at least one candidate region in the plurality of candidate regions corresponding to the sample image, wherein determining the set of training samples based on the plurality of candidate regions corresponding to the sample image and the plurality of enhanced object regions comprises: for each current enhanced object region in the plurality of enhanced object regions, calculating a respective intersection over union between each of the plurality of candidate regions and the current enhanced object region to determine overlap degrees corresponding to the plurality of candidate regions respectively; determining, based on the overlap degrees corresponding to the plurality of candidate regions respectively and an overlap degree threshold, a set of training samples corresponding to the current enhanced object region; and determining, based on the set of training samples corresponding to the plurality of enhanced object regions respectively, the set of training samples corresponding to the sample image, thereby affecting an accuracy level of the object detection model.

15. The system according to claim 14, wherein performing the movement operation on the object region in the sample image to determine the plurality of enhanced object regions comprises:

performing, based on a preset path, the movement operation on the object region in the sample image to determine the plurality of enhanced object regions.

16. The system according to claim 14, wherein the overlap degree threshold comprises a fixed overlap degree threshold and a dynamic overlap degree threshold, and wherein determining, based on the overlap degrees corresponding to the plurality of candidate regions respectively and an overlap degree threshold, a set of training samples corresponding to the current enhanced object region comprises:

determining, based on the overlap degrees corresponding to the plurality of candidate regions respectively and the fixed overlap degree threshold, a first set of training samples corresponding to the current enhanced object region, wherein the first set of training samples comprises at least one candidate region in the plurality of candidate regions;

determining, based on the overlap degrees corresponding to the plurality of candidate regions respectively, an overlap degree corresponding to the current enhanced object region, and determining, based on the overlap degrees corresponding to the plurality of enhanced object regions respectively, a mean value and a standard deviation of the overlap degrees;

determining, based on the first set of training samples corresponding to the plurality of enhanced object regions respectively, a stability coefficient of the current enhanced object region;

determining, based on the mean value and the standard deviation of the overlap degrees, and the stability coefficient of the current enhanced object region, a dynamic overlap degree threshold of the current enhanced object region;

determining, based on the overlap degrees corresponding to the plurality of candidate regions and the dynamic overlap degree threshold of the current enhanced object region, a second set of training samples corresponding to the current enhanced object region; and determining, based on the first set of training samples corresponding to the current enhanced object region and the second set of training samples corresponding to the current enhanced object region, the set of training samples corresponding to the current enhanced object region.

17. The system according to claim 14, before performing the movement operation on the object region in the sample image to determine the plurality of enhanced object regions, further comprising:

for each current object region in a plurality of object regions in the sample image, performing pre-moving on the current object region to determine a plurality of pre-enhanced object regions corresponding to the current object region, wherein the plurality of pre-enhanced object regions comprise the current object region and a plurality of pre-moved object regions corresponding to the current object region;

determining, based on the plurality of candidate regions corresponding to the sample image and the plurality of pre-enhanced object regions corresponding to the current object region, an overlap degree corresponding to the current object region; and determining, based on overlap degrees corresponding to the plurality of object regions respectively, a movement order of the plurality of object regions to perform the movement operation on the plurality of object regions in the sample image according to the movement order.

18. The system according to claim 14, wherein the object detection model is configured to detect an object in an image to be detected.

19. The system according to claim 14, wherein the object detection model is configured to:

determine an image to be detected; and detect the image to determine the object region in the image.

20. The system of claim 14, wherein the movement operation on the object region in the sample image is determined based on simulating a moving state of an object in the sample image.

*    *    *    *    *